(12) United States Patent
Nishimura

(10) Patent No.: US 6,875,481 B2
(45) Date of Patent: **\*Apr. 5, 2005**

(54) OPTICAL LAMINATE

(75) Inventor: Suzushi Nishimura, Kanagawa (JP)

(73) Assignee: Nippon Oil Corporation, Tokyo (JP)

( * ) Notice: Subject to any disclaimer, the term of this patent is extended or adjusted under 35 U.S.C. 154(b) by 406 days.

This patent is subject to a terminal disclaimer.

(21) Appl. No.: 10/037,215

(22) Filed: Oct. 19, 2001

(65) Prior Publication Data

US 2002/0110651 A1 Aug. 15, 2002

Related U.S. Application Data

(63) Continuation of application No. PCT/JP00/02587, filed on Apr. 20, 2000.

(30) Foreign Application Priority Data

| | | | |
|---|---|---|---|
| Apr. 21, 1999 | (JP) | ............................................ | 11-113452 |
| Apr. 26, 1999 | (JP) | ............................................ | 11-118525 |
| Apr. 26, 1999 | (JP) | ............................................ | 11-118676 |
| Apr. 26, 1999 | (JP) | ............................................ | 11-118754 |
| Jun. 22, 1999 | (JP) | ............................................ | 11-175208 |
| Jun. 22, 1999 | (JP) | ............................................ | 11-175253 |

(51) Int. Cl.$^7$ ............................................... C09K 19/00
(52) U.S. Cl. ....................................... 428/1.1; 349/201
(58) Field of Search .................. 428/1.1, 913; 349/194, 349/201

(56) References Cited

U.S. PATENT DOCUMENTS

| | | | |
|---|---|---|---|
| 4,893,906 A | 1/1990 | Makow | |
| 5,943,110 A | 8/1999 | Yoda et al. | |
| 6,061,122 A | 5/2000 | Hoshino et al. | |
| 6,580,483 B2 * | 6/2003 | Suzuki et al. | ................ 349/115 |
| 6,627,270 B1 * | 9/2003 | Nishimura | ................... 428/1.3 |
| 6,671,031 B1 * | 12/2003 | Nishimura | ................... 349/201 |

FOREIGN PATENT DOCUMENTS

| | | |
|---|---|---|
| EP | 0 435 029 B1 | 8/1995 |
| EP | 0 881 522 A1 | 5/1998 |
| EP | 0 911 758 A2 | 7/1998 |
| JP | 61-126644 A | 6/1986 |
| JP | 63-51193 A | 3/1988 |
| JP | 3-129382 A | 6/1991 |
| JP | 4-107504 A | 4/1992 |
| JP | 9-280967 A | 10/1997 |
| JP | 10-333134 A | 12/1998 |
| JP | 11-42875 A | 2/1999 |
| JP | 11-72619 A | 3/1999 |
| JP | 11-151877 A | 6/1999 |
| JP | 11-277957 A | 10/1999 |
| JP | 2000-25373 A | 1/2000 |

* cited by examiner

*Primary Examiner*—Elizabeth Mulvaney
(74) *Attorney, Agent, or Firm*—Akin Gump Strauss Haver & Feld, LLP

(57) ABSTRACT

An optical laminate comprising, laminated in the order mentioned, a support substrate, adhesive layer, cholesteric liquid crystal layer and protection layer, characterized in that the cholesteric liquid crystal layer has in at least part thereof an area indicating a diffraction power. The optical laminate is used for a polarization diffraction element, liquid crystal display device compensation element, decorative member, and forgery prevention element.

9 Claims, No Drawings

OPTICAL LAMINATE

CROSS-REFERENCE TO RELATED APPLICATION

This application is a continuation of International Application No. PCT/JP00/02587, filed Apr. 20, 2000, the disclosure of which is incorporated herein by reference.

FIELD OF THE INVENTION

This invention relates to optical laminates comprising a novel cholesteric liquid crystal layer which can generate a diffracted light having a polarizability.

BACKGROUND OF THE INVENTION

Diffraction elements are general-purpose optical elements widely used for the purpose of spectrally splitting light or dividing luminous flux in the field of spectroscopic optics. The diffraction elements are classified into some types according the shape thereof. In general, they are classified into an amplitude type diffraction element in which light-transmitting parts and non-light-transmitting parts are periodically arranged; and a phase type diffraction element in which grooves are periodically formed on a high-transmittance material. Separately from this classification, they may be classified into a transmission type diffraction element and a reflection type diffraction element according to the direction in which the diffracted light is generated.

With the conventional diffraction elements as described above, the diffracted light obtained when natural light (unpolarized light) is made incident thereon is restricted to unpolarized light. With a polarizing optical element frequently used in the fields of spectroscopic optics, only unpolarized light can be obtained as the diffracted light. For this reason, there is generally employed a method in which the natural light emitted from a light source is spectrally split by a diffraction element, and further, in order to utilize only a specific polarization component contained therein, the diffracted light is allowed to pass through a polarizer to be used. With this method, there is a problem that the quantity of light is reduced by half because about 50 percent of the resulting diffracted light is absorbed by the polarizer. Therefore, it is also required to prepare a detector with a high sensitivity and a light source capable of producing a large quantity of light. Under such circumstances, there has arisen a demand for the development of such a diffraction element that the diffracted light itself is specific polarized light such as circularly polarized light or linearly polarized light.

DISCLOSURE OF THE INVENTION

The present invention has been achieved in view of the foregoing problems. The present inventors succeeded in imparting diffractivity to a region of a cholesteric liquid crystal layer. More specifically, it was found that an optical laminate suitably functioning as a polarizing diffraction element can be obtained using a cholesteric liquid crystal layer imparted with novel characteristics, that is, diffractivity in combination with selective reflection properties and circularly polarization properties both of which are peculiar to a cholesteric liquid crystal.

That is, the present invention relates to an optical laminate comprising at least a support substrate, an adhesive layer, a cholesteric liquid crystal layer, and a protection layer, the cholesteric liquid crystal layer having on at least a part thereof a region exhibiting diffractivity.

The optical laminate of the present invention has such a structure that a support substrate, an adhesive layer, a cholesteric liquid crystal layer, and a protection layer are laminated in the order mentioned. The expression "a support substrate/ an adhesive layer/ a cholesteric liquid crystal layer/ a protection layer" means that they are laminated in this order.

Below, each of the structural components of the optical laminate of the invention will be described.

Supporting Substrate

Supporting substrates useful in the present invention are any articles having two surface dimensions and one thickness dimension, such as sheet-, film-, and plate-like articles. The materials for such substrates may be synthetic resins such as polyimide, polyamide-imide, polyamide, polyether imide, polyether ether ketone, polyether ketone, polyketone sulfide, polyether sulfone, polysulfone, polyphenylene sulfide, polyphenylene oxide, polyvinyl chloride, polystyrene, polypropylene, polymethyl methacrylate, polyethylene terephthalate, polybutylene terephthalate, polyethylene naphthalate, polycarbonate, polyvinyl alcohol, polyacetal, polyarylate, cellulose-based plastics, epoxy resins and phenol resins, papers, synthetic papers, nonwoven fabrics, metal foils, metal sheets, and glass sheets.

They do not necessarily have a smooth surface from macroscopic and microscopic view and may have roughness on their surfaces.

Adhesive Layer

The adhesive layer for bonding the above-described supporting substrate to the cholesteric liquid crystal layer described below may be formed from conventionally known various reactive adhesives such as pressure-sensitive adhesives, hot melt type adhesives, and thermo-, photo- or electron beam-setting adhesives. Among these adhesives, preferred are photo- or electron beam-setting adhesives obtained by adding, if required, other monofunctional and/or polyfunctional monomers, various polymers, stabilizers, polymerization initiators, and sensitizers to photo- or electron beam-polymerizable prepolymers and/or monomers.

Specific examples of the photo- or electron beam-polymerizable prepolymers are polyester acrylate, polyester methacrylate, polyurethane acrylate, polyurethane methacrylate, epoxy acrylate, epoxy methacrylate, polyol acrylate, and polyol methacrylate. Further examples of the photo- or electron beam-polymerizable monomers are monofunctional acrylate, monofunctional methacrylate, bifunctional acrylate, bifunctional methacrylate, and polyfunctional acrylate having 3 or more functional groups, and polyfunctional methacrylate having 3 or more functional groups.

Commercially available products of these prepolymers and monomers can be used. Examples of such products are Aronix (acrylic speciality monomer, oligomer manufactured by Toagosei Co., Ltd.), Light Ester manufactured by Kyoeisha Chemical Co., Ltd. and Viscoat manufactured by Osaka Organic Chemical Industry Ltd.

Examples of the polymerization initiators are benzophenone derivatives, acetophenone derivatives, benzoin derivatives, thioxanthones, Michler's ketone, benzyl derivatives, triazine derivatives, acylphosphine oxides, and azo compounds.

When the photo- or electron beam-setting reactive adhesive is used for forming the adhesive layer, the viscosity of the adhesive is appropriately selected according to the conditions where the adhesive layer is formed. However, at a temperature of 25° C. the viscosity is in the range of generally 10 to 2000 mPa·s, preferably 50 to 1000 mPa·s, and more preferably 100 to 500 mPa·s. When the viscosity is less than 10 mPa·s, it is difficult to obtain a desired thickness. When the viscosity exceeds 2000 mPa·s, the workability may be undesirably reduced. When the viscosity departs from the aforesaid range, it is preferred to adjust the ratio of the solvent to the monomer appropriately so as to obtain a desired viscosity.

The photo-setting reactive adhesive can be cured by means of known curing means such as low-pressure mercury lamps, high-pressure mercury lamps, super high-pressure mercury lamps, metal halide lamps, and xenon lamps. The irradiation dose is appropriately adjusted according to the type of reactive adhesive. However, the irradiation dose is selected from the range of generally 50 to 2000 mJ/cm$^2$, preferably 100 to 1000 mJ/cm$^2$. The electron beam-setting reactive adhesive can be cured by means of any suitable electron beam irradiation device. However, there are generally used an electron beam-irradiation device of which acceleration voltage is within the range of 50 to 1000 kV, preferably 100 to 500 kV.

When the adhesive layer of the optical laminate of the present invention is formed from the hot-melt type adhesive, any types of those may be used. However, from the viewpoint of workability upon formation of the adhesive layer, it is preferred to use those of a working temperature of 80 to 200° C., preferably 100 to 160° C. Specific examples of such hot-melt type adhesive are ones produced using for example, ethylene-vinyl acetate copolymer resins, polyester-based resins, polyurethane-based resins, polyamide-based resins, thermoplastic rubbers, polyacrylic resins, polyvinyl alcohol-based resins, polyvinyl acetal-based resins such as polyvinyl butyral, petroleum-based resins, terpene-based resins, or rosin-based resins, as a base resin.

The adhesive layer may be formed from a pressure sensitive adhesive. In such a case, it may be rubber-based, acrylic, silicone-based, and polyvinyl ether-based pressure sensitive adhesives.

When any of these adhesives is used for forming the adhesive layer, the thickness thereof may be appropriately selected as long as the adhesive can bond tightly the supporting substrate to the cholesteric liquid layer described hereinbelow. However, the thickness is generally within the range of 0.5 to 50 μm, and preferably 1 to 10 μm.

The adhesive layer may be formed by any known method, such as roll coating, die coating, bar coating, curtain coating, extrusion coating, gravure roll coating, spray coating, and spin coating.

Cholesteric Liquid Crystal Layer

The cholesteric liquid crystal layer of the optical laminate of the present invention has generally a thickness within the range of 0.1 to 50 μm. The deviation of such a maximum range fails to obtain an optical laminate as intended by the present invention.

The cholesteric liquid crystal layer comprises a cholesteric liquid crystal film having on a part thereof a region exhibiting diffractivity. The cholesteric liquid crystal layer is preferably formed from a cholesteric film having on a part thereof a region exhibiting diffractivity. When the cholesteric liquid crystal layer is formed from a plurality of cholesteric liquid crystal films, at least one of them must has on a part thereof a region exhibiting diffractivity.

The term "region exhibiting diffractivity" used herein denotes a region exhibiting such an effect that the light passing through the region, or the light reflected from the region is diffracted into the portion geometrically corresponding to a shadow. The presence or absence of the region exhibiting diffractivity can be confirmed by observing whether there is present or not present the light emitted at a certain angle (high-order light) from a sample film other than the light linearly transmitted therethrough or reflected therefrom (zero-order light) when, for example, laser light or the like is made incident upon the film. Alternatively, whether the region is formed or not can be confirmed by observing the surface and cross-section of the cholesteric liquid crystal film by means of an atomic force microscope, or a transmission electron microscope.

The cholesteric liquid crystal film used for forming the cholesteric liquid crystal layer has a region exhibiting diffractivity partially or entirely in the second dimension direction, i.e., surface direction. When the film has a region exhibiting diffractivity partially in the second dimension direction, no particular limitation is imposed on the number of the region and all the regions are not required to exhibit the mutually same diffractivity. When the film has a region exhibiting diffractivity entirely in the second dimension direction, the diffraction power may not be uniform. The region exhibiting diffractivity partially or entirely in the second dimension direction may be present on either or both of the surface layers viewing from the film thickness direction or may be present inside the film.

The thickness of the region formed partially or entirely in the second dimension direction may not be uniform, but is generally 50 percent or less, preferably 30 percent or less, and more preferably 10 percent or less of the thickness of the film. When the thickness exceeds 50 percent, the selective reflection characteristics and circularly polarization characteristics peculiar to a cholesteric liquid crystal phase may be degraded.

The region exhibiting diffractivity assumes the cholesteric orientation in which the helical axes are not homogeneously parallel with each other in the direction of the thickness, and preferably assumes the cholesteric orientation in which the helical axes are not homogeneously parallel with each other in the direction of the thickness, and the helical pitch lengths are not homogeneously equal in the direction of the thickness. Whereas, the other regions preferably assume the helical structure in which the helical axes are homogeneously parallel with each other in the direction of the thickness, and the helical pitch lengths are homogeneously equal in the direction of the thickness.

The cholesteric liquid crystal film having a region exhibiting diffractivity may be prepared by a method in which using an aligning substrate capable of forming the above-described orientation, a polymeric liquid crystal, a low molecular weight liquid crystal, or a mixture thereof is cholesterically oriented on the aligning substrate and is fixed as the cholesteric phase is maintained. There is an easier method in which a normal cholesteric liquid crystal film of which cholesteric phase is fixed is prepared using a polymeric liquid crystal, a low molecular weight liquid crystal, or a mixture thereof, and a normal aligning substrate and then the diffraction pattern of a diffraction element is transferred onto the film by applying heat and/or pressure to the film while being contacted with the element.

The following is one example of preparing a cholesteric liquid crystal film having a region exhibiting diffractivity by the aforesaid transferring method.

Preparation of a Liquid Crystal Material and a Cholesteric Liquid Crystal Film

The cholesteric liquid crystal film is usually produced from a liquid crystal material containing a low molecular weight liquid crystal and/or a polymeric liquid crystal.

Low molecular weight liquid crystals eligible in the present invention are those having a biphenyl, phenylbenzoate, or stilbene derivative to which a functional group such as acryloyl, vinyl, and epoxy is introduced, as a base skeleton. The low molecular weight liquid crystal may exhibit either lyotropic properties or thermotropic properties. Preferred are those having thermotropic properties with the objective of workability and processability.

Eligible polymeric liquid crystals are those of main-chain type or side-chain type. Specific examples are main-chain type polymeric liquid crystals such as polyester, polyamide, polycarbonate, and polyester imide, and side-chain type polymeric liquid crystals such as polyacrylate, polymethacrylate, polymalonate, and polysiloxane. Among these, preferred is liquid crystalline polyester because it has an excellent orientability and is relatively easy to synthesize. Suitable examples of the constituting unit of the polymer are an aromatic or aliphatic diol unit, an aromatic or faliphatic dicarboxylic acid unit, and an aromatic or aliphatic hydroxycarboxylic acid unit.

When a polymeric liquid crystal is used as a liquid crystal material, the polymeric liquid crystal preferably has the following physical characteristics:

(1) Weight-average molecular weight Mw in terms of polystyrene measured by GPC=1000 to 100000, (2) Molecular weight distribution (Mw/Mn, Mn is number-average molecular weight)=5 or less, (3) Inherent viscosity=0.05 to 2.0 (in phenol/tetrachloroethane (60/40 weight ratio) solvent at 30° C., the concentration, is 0.5 g/dl), and (4) Glass transition point temperature (Tg)=200° C. or below (5) Transition temperature from liquid crystalline phase to isotropic phase (Ti)=40° C. or higher.

A weight-average molecular weight of a polymeric liquid crystal less than 1000 is not preferred in terms of processability in the after-treatment processes and applicability, because the resulting cholesteric liquid crystal film becomes weak in mechanical strength. A weight-average molecular weight of a polymeric liquid crystal in excess of 100000 would deteriorate the flowability of the resulting liquid crystal and thus adversely affect the orientation. A molecular weight distribution in excess of 5 would cause the deterioration of the dissolubility when preparing the cholesteric liquid crystal film, and solubility to a solution and thus pose a problem in applicability that it is hard to obtain the homogeneous orientation in a cholesteric phase. An inherent viscosity of less than 0.05 would cause the decrease of the mechanical strength of the resulting film and thus is not preferred in terms of processability in the various after-treatment processes and applicability. An inherent viscosity in excess of 2 would cause the deterioration of flowability of the liquid crystal, leading to a difficulty in obtaining the homogeneous orientation in a cholesteric phase. A glass transition point temperature (Tg) of higher than 200° C. would cause the deterioration of flowability in the crystalline state, leading to a difficulty in obtaining the homogeneous orientation in the cholesteric phase. Furthermore, there is a possibility that it is difficult to select a supporting substrate to be used if required for alignment. A transition temperature from liquid crystalline phase to isotropic phase (Ti) of less than 40° C. would cause the deterioration of the orientation stability of the resulting cholesteric liquid crystal film.

For the purpose of enhancing the heat-resistance of the resulting film, cross-linkers such as bisazide compounds and glycidyl methacrylate may be added to the liquid crystal material containing a low molecular weight liquid crystal and/or a polymeric liquid crystal, in such a range as not to bother the development of the cholesteric phase. The addition of such cross-linkers is effective in crosslinking the liquid crystalline molecules in a state in which the cholesteric phase is developed. Furthermore, various additives such as dichroic dye, dyes, and pigments may be added to the liquid crystal material in such an range that the effects achieved by the present invention are not hindered.

Any known methods may be employed for making the cholesteric liquid crystal film from the above-described liquid crystal material containing the low molecular liquid crystal material and/or the polymeric liquid crystal material. For example, when using the polymeric liquid crystal material, there may be used a method in which the liquid crystal material is applied in the form of film on a suitable alignment film and then subjected to a heat-treatment so as to develop a cholesteric liquid crystal phase, followed by quenching the phase thereby fixing the cholesteric phase. When using the low molecular liquid crystal material, there may be used a method in which the liquid crystal material is applied in the form of a film on a suitable alignment film and then subjected to a heat-treatment so as to develop a cholesteric liquid crystal phase, followed by irradiating light or electron beam or applying heat thereto as it is so as to be crosslinked thereby fixing the cholesteric phase.

A region exhibiting diffractivity can be provided on the cholesteric liquid crystal film at the stage where the cholesteric liquid crystal phase is developed, by means of a diffraction grating film having a diffraction pattern as the alignment substrate.

When the cholesteric liquid crystal film is prepared from the liquid crystal material containing the low molecule liquid crystal and/or the polymeric liquid crystal, the thickness of the film is in the range of generally 0.1 to 30 $\mu$m, preferably 0.3 to 20 $\mu$m, and particularly preferably 0.5 to 10 $\mu$m. The heat treatment for developing the cholesteric liquid crystal phase on the film is conducted under the conditions where the temperature is generally from 30 to 250° C., preferably 40 to 200° C., and particularly preferably 50 to 170° C. and the time is usually from 5 seconds to 2 hours, preferably 10 seconds to 1 hour, and particularly preferably 20 seconds to 30 minutes.

In the case where the liquid crystal material contains the low molecular liquid crystal or the polymeric liquid crystal, the diffusivity of the cholesteric liquid crystal film can be adjusted by appropriately selecting the film thickness and the heat treatment conditions within the above-described ranges.

The term "diffusivity" used herein is defined by the percentage of specular competent exclude (SCE) to specular competent include (SCI), that is, (SCE/SCI)×100. The SCI of a cholesteric liquid crystal film denotes the total reflectance derived when a diffusive light is uniformly illuminated to the film. The SCE denotes the reflectance obtained by excluding the reflectance of the so-called specular reflection light components from the total reflectance, that is, the reflectance of the light components diffusing at the film surface(generally referred to as "diffusive reflectance"). There is the relationship of "total reflectance=specular reflectance+diffusive reflectance".

The specular competent exclude and specular competent include of a film can be measured in accordance with "Methods of color measurement-Reflecting and transmitting objects" prescribed in JIS-Z-8722 by means of a measuring apparatus, for example a spectral calorimeter having an illumination/receptor optic system wherein d/8 (diffused illumination 8°) is received, such as CM-3500d manufactured by Minolta Co., Ltd.

When the diffusivity is 15 percent or less, the cholesteric liquid crystal film exhibits a specular surface. When the diffusivity is 15 percent or more, the cholesteric liquid crystal film exhibits a non-specular surface.

Imparting Diffractivity

Diffractivity can be imparted to a part or the whole of the cholesteric liquid crystal film by transferring the diffraction pattern of a diffraction grating to the cholesteric liquid crystal film. Eligible diffraction gratings may be all types of elements as long as they have a function to generate a diffracted light, such as a mechanically ruled diffraction grating, a film thickness modulation hologram type diffraction grating, and a refractive index modulation hologram type diffraction grating having an undulated surface diffracting light. No particular limitation is imposed on the materials of the diffraction grating. Therefore, it may be made of a metal or a synthetic resin. A replica grating is also eligible.

The diffraction grating is preferably in the form of a film or laminate attached to a suitable substrate.

A diffraction pattern is usually transferred by a method in which the diffraction-patterned surface of a diffraction grating and a cholesteric liquid crystal film are brought into contact and then heated and pressurized by means of a heat roller, a laminator, a hot stamp, an electrothermal plate, or a thermal head. The conditions of heating and pressurizing can not be determined with certainty because they depend on the physical characteristics of the cholesteric liquid crystal film and the type of diffraction grating. However, the pressure is in the range of usually 0.01 to 100 MPa, and preferably 0.05 to 80 MPa, while the temperature is in the range of 30 to 400° C., and preferably 40 to 300° C.

After transferring a diffraction pattern, the diffraction grating is peeled off and removed from the cholesteric liquid crystal film thereby obtaining the cholesteric liquid crystal film having on a part or the whole thereof a region exhibiting diffractivity.

Protection Layer

The protection layer may be formed from a film obtained by curing a composition comprising a thermo-, photo-, or electron beam-setting reactive adhesive and an ultraviolet absorber and/or a hard coat agent. Alternatively, the protection layer may be formed from a film obtained by curing a composition comprising a resin having film forming properties, and an ultraviolet absorber and/or a hard coat agent. Eligible reactive agents are the above-mentioned thermo-, photo-, or electron beam-setting reactive adhesives. Eligible resins having film forming properties are polyethylene, polypropylene, poly(4-methyl-pentene-1), polystyrene, ionomer, polyvinyl chloride, polymethyl methacrylate, polyethylene terephthalate, polyamide, polysulfone, and cellulose-based resin. Furthermore, other eligible resins having film forming properties are nitrocellulose, ethylcellulose, polyamide resin, polyvinyl chloride, chlorinated polyolefin, acrylic resin, polyurethane, and polyester all of which are used as a vehicle resin for gravure ink and if necessary are blended with ester gum, dammar gum, maleic acid resin, alkyd resin, phenol resin, ketone resin, xylene resin, terpene resin, or petroleum resin.

Examples of the ultraviolet absorber are organic ultraviolet absorbers such as benzophenone-based compounds, salicylate-based compounds, benzotriazole-based compounds, anilide oxalate-based compounds, and cyanoacrylate-based compounds, and inorganic ultraviolet absorbers such as cesium oxide, titanium oxide, and zinc oxide. These ultraviolet absorbers may be used alone or in combination. Among these, the benzophenone-based compounds with a high ultraviolet absorption efficiency are preferably used. The content of the ultraviolet absorber in the protection layer is in the range of generally 0.1 to 20 percent by weight, and preferably 0.5 to 10 percent by weight.

Examples of the hard coat agent are organopolysiloxane-based agents, photo-setting type acryl oligomer-based agents, urethane acrylate-based agents, epoxyacrylate-based agents, polyester acrylate-based agents, thermo-setting acrylsilicone-based agents, and inorganic hard coat agents such as ceramics. They are may be used alone or in combination. Among these, the organopolysiloxane-based agents and the photo-setting type acryl oligomer-based agents are preferred from the viewpoints of film forming properties, and the like. These hard coat agents may be a solventless type or a solvent type.

The protection layer preferably has both ultraviolet absorbing properties and hard coat properties but does not necessarily have both of these properties. The protection layer with ultraviolet absorbing properties is formed from a composition containing an ultraviolet absorber. The protection layer with hard coat properties is formed from a compound containing a hard coat agent. The protection layer with both of the properties is formed from a composition containing an ultraviolet absorber and a hard coat agent, or from two compounds one of which contains an ultraviolet absorber and the other of which contains a hard coat agent. In the latter case, the hard coat layer obtained from a composition containing a hard coat agent is preferably used as a top coat layer.

Regardless of whether the protection layer contains an ultraviolet absorber and a hard coat agent or either one of them, each composition forming the protection layer is if necessary blended with various additives including hindered amine-based light stabilizers, antistatic agents, slip improvers, dyes, pigments, surfactants, fillers such as fine silica and zirconia. No particular limitation is imposed on the mixing ratio of these additives as long as it is not such a range as to mar the effects achieved by the present invention. However, it is in the range of generally 0.01 to 10 percent by weight, and preferably 0.05 to 5 percent by weight.

The protection layer is formed by any known method such as roll coating, dipping, gravure coating, bar coating, spin coating, spray coating, and printing methods. The thickness of the protection layer varies depending on the purposes of using the optic laminate of the present invention, but is in the range of generally 0.1 to 100 $\mu$m, and preferably 1 to 50 $\mu$m.

The protection layer may be formed from suitable number of commercially available ultraviolet absorbing film and/or hard coat film, instead of using the above-described compositions, or alternatively formed by laminating one or more hard coat films onto an ultraviolet absorbing layer obtained from a composition containing an ultraviolet absorber. The above-described reactive adhesives can be used for gluing the films each other or the ultraviolet absorbing layer and the hard coat film. In place of the commercially available hard coat films, there may be used ones obtained by applying the above-described hard coat agent onto a transparent supporting film formed from polymethyl methacrylate, polystyrene, polycarbonate, polyether sulfone, polyphenylene sulfide, amorphous polyolefin, triacetyl cellulose, polyethylene terephthalate, or polyethylene naphthalate.

In the case where the protection layer has hard coat properties, the hardness of the layer is desirably 3 or greater, and preferably 4 or greater in discoloration when the evaluation is carried out in accordance with the testing method prescribed in JIS L 0849.

The method of producing the optical laminate of the present invention is now described herein below.

The optical laminate of the present invention has such a structure that a supporting substrate, an adhesive layer, a cholesteric liquid crystal layer, and a protection layer are laminated in this order. As described above, the cholesteric liquid crystal layer must comprise a cholesteric liquid crystal film having on at least a part thereof a region exhibiting diffractivity. However, preferably the whole of the cholesteric liquid crystal layer is formed from single cholesteric liquid crystal film having on at least a part thereof a region exhibiting diffractivity. Therefore, in the following explanation for the sake of convenience, the cholesteric liquid crystal layer is taken to be formed from one cholesteric liquid crystal film having at least partially a region exhibiting diffractivity. Such a film is hereinafter referred to merely as "cholesteric liquid crystal film having diffractivity".

A first method of producing an optical laminate according to the present invention is a method in which a supporting layer is bonded to a cholesteric liquid crystal film having diffractivity through an adhesive so as to obtain a three-layered laminate of the supporting substrate, adhesive layer, and film, followed by laminating a protection layer thereover. A second method is done by preparing a two-layered laminate of a cholesteric liquid crystal film having diffractivity and a protection layer and then bonding a supporting substrate to the film through an adhesive.

As already described, for the preparation of the cholesteric liquid crystal film having diffractivity, there is generally employed a method in which the diffraction pattern of a diffraction grating is transferred to the surface of the cholesteric liquid crystal film prepared on a suitable alignment substrate. Therefore, when using the film with the alignment substrate attached for the preparation of the optical laminate of the present invention and taking a look at the cholesteric liquid crystal film of the optical laminate finally obtained, the laminate having the film with the diffraction-patterned surface faces the adhesive layer is produced by the first method since at the stage of preparing the three-layered laminate, the diffraction-patterned surface of the film faces the adhesive layer. Whereas, since at the stage of preparing the two-layered laminate of the cholesteric liquid crystal film and the protection layer in the second method the film surface with the transferred diffraction pattern faces the protection layer, the optical laminate with the cholesteric liquid crystal film surface located on the protection layer side is obtained.

There may be employed an alternative method for the second one in which a cholesteric liquid crystal film having diffractivity and an easily peelable substrate are bonded to each other with a composition for the protection layer containing a reaction adhesive so as to obtain a three-layered laminate of the film, protection layer, and easily peelable substrate, followed by peeling off the substrate after bonding the film and a supporting substrate. This alternative method is advantageous in mass-producing the laminates of which substrates are different. The optical laminate produced by this method has the diffraction-patterned film surface located at the protection layer side.

Various plastic films may be used for the aforesaid easily peelable substrate. Specific examples are olefin resins such as polyethylene, polypropylene, 4-methylpentene-1 resin, polyamide, polyimide, polyamideimide, polyether amide, polyether imide, polyether ketone, polyether ether ketone, polyether sulfone, polyketone sulfide, polysulfone, polystyrene, polyphenylene sulfide, polyphenylene oxide, polyethylene terephthalate, polybutylene terephthalate, polyarylate, polyacetal, polycarbonate, polyvinyl alcohol, and cellulose-based plastics. If necessary, the plastic films used for the easily peelable substrate may be coated with silicone or fluorine plastic beforehand, provided with a thin film, or subjected to physical treatments such as evaporation and surface-polish for the purpose of enhancing the peelability.

The easily peelable substrate may be peeled off manually. Alternatively, it may be mechanically peeled off by means of rollers. There may also be used a method in which the substrate is peeled off by utilizing a difference in thermal expansion coefficient between the protection layer and the substrate; a method in which it is entirely immersed in a poor solvent with respect to all the components and then mechanically peeled off; and a method in which it is peeled off by applying an ultrasonic wave in a poor solvent.

Industrial Applicability

The optical laminate of the present invention has a specific effect that the diffracted light has a circular polarizability, which the prior art optical components do not have. The use of the optical laminate in a spectroscopic optical instrument requiring polarization such as an ellipsometer makes it possible to extremely enhance the use efficiency of light. In a conventional spectroscopic instrument requiring polarization, the light emitted from a light source has been required to be spectrally split into light components of different wavelengths using a diffraction grating or a prism, and then allowed to pass through a polarizer, or to be spectrally split after being allowed to pass through a polarizer. The polarizer has presented a problem that it absorbs about 50 percent of the incident light, and the reflection occurs at the interface, resulting in an extremely low use efficiency of light. However, the use of the optical laminate of the present invention makes it possible to achieve very high, theoretically about 100 percent use efficiency of light. Furthermore, the optical laminate of the present invention can control the transmission and blocking of the diffracted light with ease using a conventional polarizer. In general, the diffracted light having no polarizability can not be completely blocked even using any polarizers in combination. Namely, with the optical laminate of the present invention, the diffracted light having a right-handed polarizability can be completely blocked only when a left-handed circularly polarizing plate is used. Therefore, the complete blocking can not be achieved even using any other polarizing plate. Since the optical laminate has such an effect, by changing the state of the polarization plate, for example, in the environment where an observer observes a diffracted image over the polarizing plate the laminate makes it possible to allow the diffracted image to suddenly emerge from a dark field, or to suddenly disappear.

As described above, the optical laminate of the present invention has a wide variety of use as a novel diffraction function element, and can be used as various optical elements and optoelectronic elements, decorative components, counterfeit preventing elements, and the like.

The optical laminate of which supporting substrate is a transparent and isotropic film is useful as optical elements and optoelectronic elements. Examples of such a transparent and isotropic film are a triacetyl cellulose film such as Fujitac manufactured by Fuji Photo Film Co., Ltd. and Konicatac manufactured by Konica Corp., a TPX film manufactured by Mitsui Chemicals Inc., Arton film manufactured by JSR Corp., Zeonex film manufacture by Zeon Corp., Ltd., and Acryprene film manufactured by Mitsubishi Rayon Co., Ltd. Various liquid crystal displays having improved color compensation and/or viewing angle can be obtained by arranging this type of optical laminate in liquid crystal displays such as TN (Twisted Nematic)-LCD (Liquid Crystal Display), STN (Super Twisted Nematic)-LCD, ECB (Electrically Controlled Birefringence)-LCD, OMI (Optical Mode Interference)-LCD, OCB (Optically Compensated Birefringence)-LCD, HAN (Hybrid Aligned Nematic)-LCD, and IPS (In Plane Switching)-LCD. The optical laminate of the present invention can be used as the foregoing spectroscopic optical instrument requiring a spectrally split polarized light and also as a polarization optical element obtaining a light ray of a specific wavelength by utilizing the diffraction phenomenon, an optical filter, a circularly polarizing plate, and a photodiffusion sheet. Furthermore, a linearly polarizing plate can also be obtained by combining the optical laminate with a quarter-wave plate. Therefore, the optical laminate of the present invention can provide various optical components capable of exerting unprecedented optical effects as the optical elements and optoelctronic elements.

As the decorative components, there can be obtained various designable film, combining the rainbow coloration effect due to the diffraction power and the vivid coloration effect due to the cholesteric liquid crystal. Furthermore, since the optical laminate of the present invention can be formed into a thin film, the film attached to or integrated in the existing product is significantly contributive to the differentiation from other similar products. When the optical laminate embedded with a designed diffraction pattern is attached to a glass window, the light resulting from selective reflection characteristics peculiar to the cholesteric liquid crystal having a diffraction pattern is seen as different colors depending upon the visual angle from the outside. Consequently, the resulting window is excellent in fanciness. Such a window makes it difficult to see the inside from the bright outside, nevertheless, the visibility of the outside from the inside is good.

Since the optical laminate of the present invention has both a light diffraction power and optical characteristics peculiar to a cholesteric liquid crystal, the laminate can be used as a novel counterfeit prevention film, seal, label or the like. The optical laminate of the present invention may be attached to or embedded in a sheet- or card like article such as a driver's license, an identification card, a passport, a credit card, a prepaid card, and various notes, gift cards, and securities so as to impart the ability to be prevented from counterfeit to the article. In such a case, the laminate and the article can share the same supporting substrate.

The counterfeit of the optical laminate of the present invention is very difficult because in addition to a light diffraction power it has the wavelength selective reflection characteristics, circularly polarization selective reflection characteristics, dependence of color on a visual angle and unique coloration properties all peculiar to the cholesteric liquid crystal and the surface thereof is protected with a protection layer. Therefore, the optical lamination of the present invention is very useful as a counterfeit prevention element which is excellent in designability.

BEST MODE FOR CARRYING OUT THE INVENTION

REFERENCE EXAMPLE 1

Synthesis of Liquid Crystalline Polyester and Production of a Cholesteric Liquid Crystal Film A polycondensation reaction was conducted using 50 mmol of terephthalic acid, 20 mmol of hydroxybenzoic acid, 20 mmol of catechol, 10 mmol of (R)-2-methyl-1,4-butanediol, and 100 mg of sodium acetate under a nitrogen atmosphere while elevating a temperature stepwise, like 180° C. for 1 hour, 200° C. for 1 hour, and 250° C. for 1 hour.

The polycondensation was continued at a temperature of 250° C. for 2 hours while discharging the nitrogen and continued for another 1 hour at the same temperature under reduced pressure. The resulting polymer was dissolved in tetrachloroethane and reprecipitated with methanol thereby obtaining a liquid crystalline polyester.

A solution of the resulting polyester dissolved in N-methyl-2-pyrrolidone (20 percent by weight) was prepared and spin-coated to a rubbed polyphenylene sulfide alignment film. After the coating, the film was dried so as to remove the N-methyl-2-pyrrolidone thereby forming a liquid crystalline polyester film over the polyphenylene sulfide film.

Thereafter, the liquid crystalline film was subjected to a heat treatment at a temperature of 200° C. for 5 minutes and cooled to room temperature thereby obtaining on the polyphenylene sulfide film a liquid crystalline polyester film exhibiting a gold specular reflection.

The transmission spectrum of the film was measured using an ultraviolet, visible, infrared spectrophotometer V-570 manufactured by JASCO Co. It was confirmed that there was formed a cholesteric liquid crystal film exhibiting a selective reflection having a central wavelength of about 600 nm and a selective reflection wavelength bandwidth of about 100 nm. The cholesteric phase and cross-section of the cholesteric liquid crystal film were observed by means of a polarizing microscope and a transmission electron microscope. It was confirmed that the helical axes of the cholesteric liquid crystal phase were homogeneously parallel with each other in the direction of the thickness, and the helical pitch lengths were homogeneously equal in the direction of the thickness.

Each of the methods for analyzing the resulting polymer is as follows:
(1) Inherent viscosity of polymer:
It was measured by means of Ubbelohde's viscometer in a phenol/tetrachloroethane (60/40 weight ratio) solvent at a concentration of 0.5 g/100 ml, and 30° C.
(2) Glass transition temperature (Tg):
It was measured by means of Du Pont 990 Thermal Analyzer
(3) Identification of liquid crystalline phase and measurement of transition temperature therefrom to isotropic phase:
They were observed by means of BH2 polarization microscope equipped with a hot stage, manufactured by Olympus Optical Co., Ltd.
(4) Molecular weight and molecular weight distribution by GPC:
The weight-average molecular weight (Mw) and number-average molecular weight (Mn) of a standard polystyrene of which these weights are already known were measured by means of columns of TSKG3000HXL, G2000HXL, and G1000HXL manufactured by Tosoh Corporation and connected in series and using a tetrahydrofuran (THF) solvent at a temperature of 25° C. and flow rate of 0.7 ml/minute so as to prepare a calibration curve chart. From the chromatography of a sample liquid crystalline polymer measured under the same conditions, the weight-average molecular weight (Mw) and number-average molecular weight (Mn) thereof were derived in terms of the standard polystyrene. From these values, the molecular weight distribution Mw/Mn was derived.

REFERENCE EXAMPLE 2

Synthesis of Liquid Crystalline Polyester and Preparation of a Cholesteric Liquid Crystal Film Various types of liquid crystalline polyesters were synthesized by the same method of Reference Example 1. The results are shown in Table 1.

Similarly to Reference Example 1, an N-methyl-2-pryrrolidone solution of each liquid crystalline polyester was prepared and formed into a cholesteric liquid crystal film on a polyphenylene sulfide film used as an alignment substrate by heating. The selective reflection color of each of the resulting films is also shown in Table 1.

The phase and cross-section of each of the resulting films were observed by means of a polarizing microscope and a transmission electron microscope. It was confirmed that the helical axes of the cholesteric liquid crystal phase were homogeneously parallel with each other in the direction of the thickness, and the helical pitch lengths were homogeneously equal in the direction of the thickness.

TABLE 1

| Reference Example | Composition (molar ratio) | Inherent Viscosity (dl/g) | Tg (° C.) | Selective Reflection Color |
|---|---|---|---|---|
| 1 | TPA:HBA:CT:MBD = 50:20:20:10 | 0.130 | 85 | gold |
| 2 | BPDA:MHQ:CT:MBD = 49:24:26:1.2 | 0.101 | 98 | red |
| 3 | TPA:CHQ:CT:MHD = 49:25:13:13 | 0.522 | 70 | orange |
| 4 | BPDA:CT:MHD = 49:40:11 | 0.234 | 69 | yellow |
| 5 | TPA:MHQ:CT:MBD = 49:24:25:1.7 | 0.150 | 90 | red |
| 6 | TPA:HBA:CT:MBD = 50:15:20:15 | 0.145 | 85 | gold |
| 7 | NDCA:HQ:CCT:DMBD = 49:30:8:13 | 0.151 | 82 | yellow |
| 8 | TPA:t-BHQ:CT:MBD = 50:21:21:8 | 0.248 | 102 | red |
| 9 | TPA:PA:MHQ:DMBD = 25:24:24:27 | 1.382 | 70 | green |
| 10 | BPDA:TPA:MBD = 45:5:52 | 0.241 | 80 | blue |

Each abbreviation in Table 1 denotes the following compounds.
TPA: terephthalic acid
MHQ: methyl hydroquinone
CT: catechol
MBD: (R)-2-methyl-1,4-butanediol
BPDA: 4,4'-biphenyldicarboxylic acid
CHQ: chlorohydroquinone
MHD: (R)-3-methyl-1,6-hexanediol
HBA: hydroxybenzoic acid
NCDA: 2,6-naphthalene dicarboxylic acid
HQ: hydroquinone
CCT: 3-chlorocatechol
DMBD: (R)(R)-2,3-dimethyl-1,4-butanediol
t-BHQ: t-butylhydroquinone
PA: phthalic acid

EXAMPLE 1

Onto the surface of the cholesteric liquid crystal film obtained in Reference Example 1, was coated a commercially available photo-setting type acrylic oligomer adhesive with a thickness of 5 μm by means of a bar coater. Then, a triacetyl cellulose (TAC) film was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide film by pinching and pulling the end thereof at an angle of 180 degrees thereby obtaining a laminate of the cholesteric liquid crystal film/adhesive layer/TAC film laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate A of the diffraction pattern-transferred cholesteric liquid crystal film/adhesive layer/TAC film. From the observation of the cholesteric liquid crystal film surface of Laminate A, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate A was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate A was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate A had on the film surface a region exhibiting diffractivity and the diffracted light was a right-handed circularly polarized light. Furthermore, from the observations, it was found that the cholesteric liquid crystal film of Laminate A can be used as the cholesteric liquid crystal film of an optical laminate according to the present invention.

Onto the cholesteric liquid crystal film surface of Laminate A, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Laminate A-1 according to the present invention.

Laminate A-1 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

As a result, the visual comparison of the reflection color of Optical Laminate A-1 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate A-1 found that they did not change, compared with those before the test.

Onto the cholesteric liquid crystal layer surface of Laminate A, was coated a UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd. and 10.0 percent by weight of M-320 (manufactured by Toagosei Co., Ltd.) with a thickness of 5 μm by means of a bar coater, followed by ultraviolet radiation so as to cure the adhesive thereby obtaining Optical Laminate A-2 according to the present invention.

Laminate A-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate A-2 found that they did not change, compared with those before the test.

Onto the cholesteric liquid crystal film surface of Laminate A, was coated a UV-setting adhesive Aronix UV-3630 (manufactured by Toagosei Co., Ltd. and diluted with M-150 and M-315 both manufactured by the same so as to be 300 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Laminate A-3 according to the present invention.

Optical Laminate A-3 thus obtained was subjected to an accelerated light-resisting test. The test was conducted at a radiation illuminance at a sample surface of 100 W/m$^2$ (wavelength range of 300 to 700 nm) for 100 hours by means of a xenon arc lamp type light-resistance test apparatus Sun Tester CPS manufactured by Shimadzu Corporation.

After the test, the visual comparison of the reflection color of Optical Laminate A-3 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate A-3 found that they did not change, compared with those before the test.

Laminate A-3 was subjected to a wear resistance test by means of a friction tester FR-I type manufactured by Suga Test Instruments Co., Ltd. Laminate A-3 was fixed such that the protection layer becomes the upper surface. A white cloth was attached to a friction element. The element was reciprocally moved in a distance of 10 cm on the laminate 50 times for 50 seconds. After the test, no scars were found and the criterion of discoloration was 3.

COMPARATIVE EXAMPLE 1

An optical laminate was obtained by following the method of producing Optical Laminate A-3 except that an ultraviolet absorber Cyasorb UV-24 manufactured by Sytec Corporation did not used.

There were apparently confirmed the rainbow coloration characteristics caused by the diffraction pattern and the selective reflectance characteristics peculiar to a cholesteric liquid.

This optical laminate was subjected to the same acceleration light resistance test as that done for Laminate A-3. After the test, the reflection color and rainbow coloration disappeared to an extent that they are hardly observed.

COMPARATIVE EXAMPLE 2

An optical laminate was obtained by following the method of producing Optical Laminate A-3 except that M-315 was not used.

It was apparently confirmed that the laminate exhibited the rainbow coloration characteristics caused by the diffraction pattern and the selective reflectance characteristics peculiar to a cholesteric liquid crystal. However, when this laminate was subjected to the same wear resistance test as that done for Laminate A-3, it was found that the laminate had scars on the surface remarkably and becomes entirely blurred in white color. The criterion of discoloration was on the order of 2. There was observed a significant difference in reflection light between before and after the test.

EXAMPLE 2

Onto the surface of the cholesteric liquid crystal film obtained in Reference Example 2, was coated a commercially available photo-setting type acrylic oligomer adhesive with a thickness of 5 μm by means of a bar coater. Then, a triacetyl cellulose (TAC) film was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the cholesteric liquid crystal film/adhesive layer/TAC film laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate B of the diffraction pattern-transferred cholesteric liquid crystal film/adhesive layer/TAC film. From the observation of the cholesteric liquid crystal film surface of Laminate B, it was apparently confirmed that there were the rainbow coloration characteristics caused by the diffraction pattern and the selective reflection characteristics peculiar to a cholesteric liquid crystal.

Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate B was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate B was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate B had on the film surface a region exhibiting diffractivity and the diffracted light was a right-handed circularly polarized light. Furthermore, from the observations, it was found that the cholesteric liquid crystal film of Laminate B can be used as the cholesteric liquid crystal film of an optical laminate according to the present invention.

Onto the cholesteric liquid crystal film surface of Laminate B, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a triazole-based ultraviolet absorber SEESORB 702 manufactured by Shipro-Kasei Co., Ltd. with a thickness of 5 μm by means of a bar coater, followed by ultraviolet irradiation so as to cure the adhesive, thereby obtaining Optical Laminate B-1 according to the present invention.

It was apparently confirmed that Laminate B-1 even when the ultraviolet absorber was laminated thereon exhibited the similar rainbow coloration characteristics caused by the diffraction pattern and the selective reflection characteristics peculiar to a cholesteric liquid crystal, similarly to those before the ultraviolet absorber was laminated.

Onto the cholesteric liquid crystal layer, was coated a silicone varnish manufactured by Shin-Etsu Chemical Co., Ltd. with a thickness of 5 μm by means of a bar coater, followed by heat-curing the varnish thereby obtaining Optical Laminate B-2 according to the present invention.

It was apparently confirmed that Laminate B-1 even when the hard coat layer was laminated thereon exhibited the similar rainbow coloration characteristics caused by the diffraction pattern and the selective reflection characteristics peculiar to a cholesteric liquid crystal, similarly to those before the hard coat layer was laminated.

Onto the cholesteric liquid crystal film surface of Laminate B, was coated an UV-setting adhesive Aronix UV-3630 (manufactured by Toagosei Co., Ltd. and diluted with M-150 and M-315 both manufactured by the same so as to be 300 mPa·s in viscosity) containing 5.0 percent by weight of a triazole-based ultraviolet absorber SEESORB 702 manufactured by Shipro-Kasei Co., Ltd. with a thickness of 5 μm by means of a bar coater, followed by ultraviolet irradiation so as to cure the adhesive, thereby obtaining Optical Laminate B-3 according to the present invention.

It was apparently confirmed that Laminate B-3 even when the protection layer having ultraviolet absorbing and hard coat properties was laminated thereon exhibited the similar rainbow coloration characteristics caused by the diffraction pattern and the selective reflection characteristics peculiar to a cholesteric liquid crystal to those before the protection layer was laminated.

EXAMPLE 3

A ruled diffraction grating film (900 lines/mm, a product of Edmond Scientific Japan Co.) and the cholesteric liquid crystal film obtained in Reference Example 3 were superimposed together in such a manner that the diffraction surface and the liquid crystal surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining a two-layered laminate of the diffraction pattern-transferred cholesteric liquid crystal film/polyphenylene sulfide film.

Onto the cholesteric liquid crystal film surface of the laminate thus obtained, was coated a commercially available photo-setting type acrylic oligomer adhesive with a thickness of 5 μm by means of a bar coater. Then, a triacetyl cellulose (TAC) film was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining Laminate C of the cholesteric liquid crystal film/adhesive layer/TAC film laminated in this order.

From the observation of the cholesteric liquid crystal film surface of Laminate C, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate C was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate C was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate C had on the film surface a region exhibiting diffractivity and the diffracted light was a right-handed circularly polarized light. Furthermore, from the observations, it was found that the cholesteric liquid crystal film of Laminate-C can be used as the cholesteric liquid crystal film of an optical laminate according to the present invention.

Onto the cholesteric liquid crystal film surface of Laminate C, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 $\mu$m by means of a bar coater, followed by ultraviolet irradiation so as to cure the adhesive, thereby obtaining Optical Laminate C-1 according to the present invention.

It was apparently confirmed that Laminate C-1 even when the ultraviolet absorber was laminated thereon exhibited the rainbow coloration characteristics caused by the diffraction pattern and the selective reflection characteristics peculiar to a cholesteric liquid crystal which are similar to those before the ultraviolet absorber was laminated.

Onto the cholesteric liquid crystal layer surface of Laminate C, was coated a UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd.) and 10.0 percent by weight of M-320 (manufactured by Toagosei Co., Ltd.) with a thickness of 5 $\mu$m by means of a bar coater, followed by ultraviolet radiation so as to cure the adhesive thereby obtaining Optical Laminate C-2 according to the present invention.

Laminate C-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the tests found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate C-2 found that they did not change, compared with those before the test.

Onto the cholesteric liquid crystal film surface of Laminate C, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 $\mu$m by means of a bar coater, followed by ultraviolet irradiation so as to cure the adhesive, thereby forming an ultraviolet absorbing layer. Thereafter, onto the ultraviolet absorbing layer, was coated a silicone varnish KR9706 manufactured by Shin-Etsu Chemical Co., Ltd. with a thickness of 5 $\mu$m by means of a bar coater, followed by heat-curing the varnish so as form a hard coat layer thereby obtaining Optical Laminate C-3 according to the present invention.

It was apparently confirmed that Laminate C-3 even when the ultraviolet absorbing layer and hard coat layer were laminated thereon exhibited the rainbow coloration characteristics caused by the diffraction pattern and the selective reflection characteristics peculiar to a cholesteric liquid crystal which are similar to those before the ultraviolet absorbing layer and hard coat layer were laminated.

Similarly to Example 1, Laminate C-3 was subjected to the accelerated light-resisting test and wear resistance test. After the test, it was confirmed that there was no change in the rainbow coloration characteristics caused by the diffraction pattern and the selective reflection characteristics peculiar to a cholesteric liquid crystal. The criterion of discoloration was 4.

EXAMPLE 4

Onto the surface of the cholesteric liquid crystal film obtained in Reference Example 4, was coated a commercially available photo-setting type acrylic oligomer adhesive with a thickness of 5 $\mu$m by means of a bar coater. Then, a polyvinyl chloride sheet was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the cholesteric liquid crystal film/adhesive layer/ polyvinyl chloride sheet laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate D of the diffraction pattern-transferred cholesteric liquid crystal film/adhesive layer/ polyvinyl chloride sheet.

From the observation of the cholesteric liquid crystal film surface of Laminate D, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate D was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate D was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate D has on the film surface a region exhibiting diffractivity and the diffracted light was a right-handed circularly polarized light. Furthermore, from the observations, it was found that the cholesteric liquid crystal film of Laminate D can be used as the cholesteric liquid crystal film of an optical laminate according to the present invention.

Onto the cholesteric liquid crystal film surface of Laminate D, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Optical Laminate D-1 according to the present invention.

Laminate D-1 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

As a result, the visual comparison of the reflection color of Optical Laminate D-1 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate D-1 found that they did not change, compared with those before the test.

Onto the cholesteric liquid crystal layer surface of Optical Laminate D, was coated a UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd.) and 10.0 percent by weight of M-320 (manufactured by Toagosei Co., Ltd.) with a thickness of 5 μm by means of a bar coater, followed by ultraviolet radiation so as to cure the adhesive thereby obtaining Optical Laminate D-2 according to the present invention.

Laminate D-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate D-2 found that they did not change, compared with those before the test.

Onto the cholesteric liquid crystal film surface of Laminate D, was coated a UV-setting adhesive Aronix UV-3630 (manufactured by Toagosei Co., Ltd. and diluted with M-150 and M-315 both manufactured by the same so as to be 300 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Optical Laminate D-3 according to the present invention.

Optical Laminate D-3 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

After the test, the visual comparison of the reflection color of Optical Laminate D-3 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate D-3 found that they did not change, compared with those before the test.

EXAMPLE 5

A ruled diffraction grating film (900 lines/mm, a product of Edmond Scientific Japan Co.) and the cholesteric liquid crystal film obtained in Reference Example 5 were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining a two-layered laminate of the diffraction pattern-transferred cholesteric liquid crystal film/polyphenylene sulfide film. Onto the cholesteric liquid crystal film surface of the laminate thus obtained, was coated a commercially available photo-setting type acrylic oligomer adhesive with a thickness of 5 μm by means of a bar coater. Then, a synthetic paper was laminated on the adhesive layer by means of a desk laminator and subjected to ultraviolet irradiation so as to cure the adhesive. After curing the adhesive, the cholesteric liquid crystal film was peeled off at the interface from the polyphenylene sulfide film by pinching and pulling the end thereof at an angle of 180 degrees thereby obtaining Laminate E of the cholesteric liquid crystal film/adhesive layer/synthetic paper laminated in this order.

From the observation of the cholesteric liquid crystal film surface of Laminate E, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate E was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate E was observed through a left-handed circularly polarizing plate transmitting only a left-handed circularly polarized light, there were observed a dark field and no reflection/diffraction light of rainbow color.

From the foregoing observations, it was confirmed that the cholesteric liquid crystal film of Laminate E has on the film surface a region exhibiting diffractivity and the diffracted light was a right-handed circularly polarized light. Furthermore, from the observations, it was found that the cholesteric liquid crystal film of Laminate E can be used as the cholesteric liquid crystal film of an optical laminate according to the present invention.

Onto the cholesteric liquid crystal film surface of Laminate E, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind., with a thickness of 5 μm by means of a bar coater, followed by ultraviolet irradiation so as to cure the adhesive, thereby obtaining Optical Laminate E-1 according to the present invention.

It was apparently confirmed that Laminate E-1 even when the ultraviolet absorber was laminated thereon exhibited the rainbow coloration characteristics caused by the diffraction pattern and the selective reflection characteristics peculiar to a cholesteric liquid crystal which are similar to those before the ultraviolet absorber was laminated.

Onto the cholesteric liquid crystal layer surface of Laminate E, was coated an UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd.) and 10.0 percent by weight of M-320 (manufactured by Toagosei Co., Ltd.) with a thickness of 5 μm by means of a bar coater, followed by ultraviolet radiation so as to cure the adhesive thereby obtaining Optical Laminate E-2 according to the present invention.

Laminate E-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate E-2 found that they did not change, compared with those before the test.

Onto the cholesteric liquid crystal film surface of Laminate E, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind., with a thickness of 5 μm by means of a bar coater, followed by ultraviolet irradiation so as to cure the adhesive, thereby obtaining Optical Laminate E-3 according to the present invention.

It was apparently confirmed that Laminate E-3 even when the ultraviolet absorbing layer and hard coat layer were laminated thereon exhibited the rainbow coloration characteristics caused by the diffraction pattern and the selective reflection characteristics peculiar to a cholesteric liquid crystal which are similar to those before the ultraviolet absorbing layer and hard coat layer were laminated.

EXAMPLE 6

Onto the surface of the cholesteric liquid crystal film obtained in Reference Example 6, was coated a commercially available photo-setting type acrylic oligomer adhesive with a thickness of 5 μm by means of a bar coater. Then, a polyvinyl chloride sheet was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the cholesteric liquid crystal film/adhesive layer/polyvinyl chloride sheet laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate F of the diffraction pattern-transferred cholesteric liquid crystal film/adhesive layer/polyvinyl chloride sheet.

From the observation of the cholesteric liquid crystal film surface of Laminate F, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate F was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate F was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate F has on the film surface a region exhibiting diffractivity and the diffracted light was a right-handed circularly polarized light. Furthermore, from the observations, it was found that the cholesteric liquid crystal film of Laminate F can be used as the cholesteric liquid crystal film of an optical laminate according to the present invention.

Onto the cholesteric liquid crystal film surface of Laminate F, was laminated an ultraviolet cut-off PET film with a thickness of 25 μm through a photo-setting acrylic oligomer adhesive with a thickness of 5 μm, thereby obtaining Optical Laminate F-1 according to the present invention.

Optical Laminate F-1 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

As a result, the visual comparison of the reflection color of Optical Laminate F-1 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate F-1 found that they did not change, compared with those before the test.

Onto the cholesteric liquid crystal layer surface of Laminate F, was coated a photo-setting acrylic oligomer adhesive wherein fine silica (Aerosil R812 manufactured by Nippon Aerosil Co., Ltd.) is dispersed with a thickness of 5 μm by means of a bar coater, followed by ultraviolet radiation so as to cure the adhesive thereby obtaining Optical Laminate F-2 according to the present invention.

Laminate F-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 4–5. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of Optical Laminate F-2 found that they did not change, compared with those before the test.

Onto the cholesteric liquid crystal film surface of Laminate F, was laminated an ultraviolet cut-off PET film with a thickness of 25 μm through a photo-setting type acrylic oligomer adhesive with a thickness of 5 μm, thereby obtaining Laminate F-3 according to the present invention.

Optical Laminate F-3 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

After the test, the visual comparison of the reflection color of Optical Laminate F-3 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of Optical Laminate F-3 found that they did not change, compared with those before the test.

Laminate F-3 was subjected to a wear resistance test by means of a friction tester FR-I type manufactured by Suga Test Instruments Co., Ltd. Laminate F-3 was fixed such that the protection layer becomes the upper surface. A white cloth was attached to a friction element. The element was reciprocally moved in a distance of 10 cm on the laminate 50 times for 50 seconds. After the test, no scar was found and the criterion of discoloration was 3–4.

EXAMPLE 7

Onto the surface of the cholesteric liquid crystal film obtained in Reference Example 7, was coated a commercially available photo-setting type acrylic oligomer adhesive with a thickness of 5 μm by means of a bar coater. Then, a glass substrate was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the cholesteric liquid crystal film/adhesive layer/glass substrate laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate G of the diffraction pattern-transferred cholesteric liquid crystal film/adhesive layer/ glass substrate laminated in this order.

From the observation of the cholesteric liquid crystal film surface of Laminate G, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate G was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate G was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate G has on the film surface a region exhibiting diffractivity and the diffracted light was a right-handed circularly polarized light. Furthermore, from the observations, it was found that the cholesteric liquid crystal film of Laminate G can be used as the cholesteric liquid crystal film of an optical laminate according to the present invention.

Onto the cholesteric liquid crystal film surface of Laminate G, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Optical Laminate G-1 according to the present invention.

Laminate G-1 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

As a result, the visual comparison of the reflection color of Optical Laminate G-1 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate G-1 found that they did not change, compared with those before the test.

Onto the cholesteric liquid crystal layer surface of Laminate G, was coated a UV-setting adhesive Aronix UV-3630 (manufactured by Toagosei Co., Ltd.) containing 20.0 percent by weight of photo-setting type acrylic oligoemer Aronix M-240 (manufactured by Toagosei Co., Ltd.) and 10.0 percent by weight of M-320 (manufactured by Toagosei Co., Ltd.) with a thickness of 5 μm by means of a bar coater, followed by ultraviolet radiation so as to cure the adhesive thereby obtaining Optical Laminate G-2 according to the present invention.

Laminate G-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystalline layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate G-2 found that they did not change, compared with those before the test.

Onto the cholesteric liquid crystal film surface of Laminate G, was coated was a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby forming an ultraviolet absorbing layer. Onto the ultraviolet absorbing layer, was coated a 20 percent by weight isopropyl alcohol solution of a mixture of Repoxy SP-1509 manufactured by Showa High Polymer Co. and 4 percent by weight of Lucirin TPO manufactured by BASF Co. with a thickness of 5 μm by means of a bar coater, followed by curing by ultraviolet irradiation of 500 mJ/cm² so as to form a hard coat layer thereby obtaining Optical Laminate G-3 according to the present invention.

Optical Laminate G-3 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

After the test, the visual comparison of the reflection color of Optical Laminate G-3 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of Optical Laminate G-3 found that they did not change, compared with those before the test.

Laminate G-3 was subjected to a wear resistance test by means of a friction tester FR-I type manufactured by Suga Test Instruments Co., Ltd. Laminate G-3 was fixed such that the protection layer becomes the upper surface. A white cloth was attached to a friction element. The element was reciprocally moved in a distance of 10 cm on the laminate 50 times for 50 seconds. After the test, no scar was found and the criterion of discoloration was 4.

EXAMPLE 8

A ruled diffraction grating film (900 lines/mm, a product of Edmond Scientific Japan Co.) and the cholesteric liquid crystal film obtained in Reference Example 8 were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining a two-layered laminate of the diffraction pattern-transferred cholesteric liquid crystal film/polyphenylene sulfide film. Onto the cholesteric liquid crystal film surface of the laminate thus obtained, was coated a commercially available photo-setting type acrylic oligomer adhesive with a thickness of 5 μm by means of a bar coater. Then, a glass substrate was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide film by pinching and pulling the end thereof at an angle of 180 degrees thereby obtaining Laminate H of the cholesteric liquid crystal film/adhesive layer/glass substrate laminated in this order.

From the observation of the cholesteric liquid crystal film surface of Laminate H, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate H was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate H was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate H had on the film surface a region exhibiting diffractivity and the diffracted light was a right-handed circularly polarized light. Furthermore, from the observations, it was found that the cholesteric liquid crystal film of Laminate H can be used as the cholesteric liquid crystal film of the optical laminate of the present invention.

Onto the cholesteric liquid crystal film surface of Laminate H, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Optical Laminate H-1 according to the present invention.

It was apparently confirmed that Laminate H-1 even when the ultraviolet absorber was laminated thereon exhibited the rainbow coloration characteristics caused by the diffraction pattern and the selective reflection characteristics peculiar to a cholesteric liquid crystal which are similar to those before the ultraviolet absorber was laminated.

Onto the cholesteric liquid crystal layer surface of Laminate H, was coated a 20 percent by weight isopropyl alcohol solution of a mixture of Repoxy SP-1509 manufactured by Showa High Polymer Co. and 4 percent by weight of Lucirin TPO manufactured by BASF Co. with a thickness of 5 μm by means of a bar coater, followed by curing by ultraviolet irradiation of 500 mJ/cm$^2$ thereby obtaining Optical Laminate H-2 according to the present invention.

It was apparently confirmed that Laminate H-2 even when the ultraviolet absorbing layer was laminated thereon exhibited the rainbow coloration characteristics caused by the diffraction pattern and the selective reflection characteristics peculiar to a cholesteric liquid crystal which are similar to those before the ultraviolet absorbing layer was laminated.

Onto the cholesteric liquid crystal film surface of Laminate H, was coated a UV-setting adhesive Aronix UV-3630 (manufactured by Toagosei Co., Ltd.) containing 20.0 percent by weight of Aronix M-240 (manufactured by Toagosei Co., Ltd.), 10 percent by weight of M-320 manufactured by the same, and 5 percent by weight of a benzophenone-based ultraviolet absorber Cyasorb UV-24 manufactured by Cytec Ind., with a thickness of 5 μm by means of a bar coater, followed by ultraviolet irradiation so as to cure the adhesive and form a protection layer having ultraviolet absorbing properties and hard coat properties, thereby obtaining Optical Laminate H-3 according to the present invention.

It was apparently confirmed that Laminate H-3 even when the ultraviolet absorbing layer and hard coat layer were laminated thereon exhibited the rainbow coloration characteristics caused by the diffraction pattern and the selective reflection characteristics peculiar to a cholesteric liquid crystal which are similar to those before the ultraviolet absorbing layer and hard coat layer were laminated.

EXAMPLE 9

Onto the surface of the cholesteric liquid crystal film obtained in Reference Example 9, was coated a commercially available photo-setting type acrylic oligomer adhesive with a thickness of 5 μm by means of a bar coater. Then, a plastic substrate with a surface covered with an aluminum film was laminated on the adhesive layer and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the cholesteric liquid crystal film/adhesive layer/aluminum film laminated in this order.

A ruled diffraction grating film (900 lines/mm, a product of Edmond Scientific Japan Co.) and the laminate thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining Laminate I of the diffraction pattern-transferred cholesteric liquid crystal film/adhesive layer/aluminum film.

From the observation of the cholesteric liquid crystal film surface of Laminate I, it was apparently confirmed that there were the rainbow coloration characteristics caused by the diffraction pattern and the selective reflection characteristics to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate I was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate I was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate I had on the film surface a region exhibiting diffractivity and the diffracted light was a right-handed circularly polarized light. Furthermore, from the observations, it was found that the cholesteric liquid crystal film of Laminate I can be used as the cholesteric liquid crystal film of an optical laminate according to the present invention.

Onto the cholesteric liquid crystal film surface of Laminate I, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Laminate I-1 according to the present invention.

Laminate I-1 thus obtained was subjected to an accelerated light-resisting test. The test was conducted at a radiation illuminance at a sample surface of 100 W/m$^2$ (wavelength range of 300 to 700 nm) for 100 hours by means of a xenon arc lamp type light-resistance test apparatus Sun Tester CPS manufactured by Shimadzu corporation.

As a result, the visual comparison of the reflection color of Optical Laminate I-1 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate I-1 found that they did not change, compared with those before the test.

Onto the cholesteric liquid crystal layer surface of Laminate I, was coated a UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd.) and 10.0 percent by weight of M-320 (manufactured by Toagosei Co., Ltd.) with a thickness of 5 μm by means of a bar coater, followed by ultraviolet radiation so as to cure the adhesive thereby obtaining Optical Laminate I-2 according to the present invention.

Laminate I-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystalline layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of Optical Laminate I-2 found that they did not change, compared with those before the test.

Onto the cholesteric liquid crystal film surface of Laminate I, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby forming an ultraviolet absorbing layer. Onto the ultraviolet absorbing layer, was coated a photo-setting acrylic oligomer adhesive wherein fine silica (Aerosil R812 manufactured by Nippon Aerosil Co., Ltd.) is dispersed, with a thickness of 5 μm by means of a bar coater, followed by ultraviolet radiation so as to cure the adhesive and form a hard coat layer thereby obtaining Optical Laminate I-3 according to the present invention.

Optical Laminate I-3 thus obtained was subjected to an accelerated light-resisting test. The test was conducted at a radiation illuminance at a sample surface of 100 W/m² (wavelength range of 300 to 700 nm) for 100 hours by means of a xenon arc lamp type light-resistance test apparatus Sun Tester CPS manufactured by Shimadzu Corporation.

After the test, the visual comparison of the reflection color of Optical Laminate I-3 between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of Optical Laminate I-3 found that they did not change, compared with those before the test.

Laminate I-3 was subjected to a wear resistance test by means of a friction tester FR-I type manufactured by Suga Test Instruments Co., Ltd. Laminate I-3 was fixed such that the protection layer becomes the upper surface. A white cloth was attached to a friction element. The element was reciprocally moved in a distance of 10 cm on the laminate 50 times for 50 seconds. After the test, no scar was found and the criterion of discoloration was 4.

EXAMPLE 10

A ruled diffraction grating film (900 lines/mm, a product of Edmond Scientific Japan Co.) and the cholesteric liquid crystal film obtained in Reference Example 10 were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co., followed by cooling to room temperature and removing the diffraction grating film thereby obtaining a two-layered laminate of the diffraction pattern-transferred cholesteric liquid crystal film/polyphenylene sulfide film. Onto the cholesteric liquid crystal film surface of the laminate thus obtained, was coated a commercially available photo-setting type acrylic oligomer adhesive with a thickness of 5 μm by means of a bar coater. Then, a plastic substrate with a surface covered with an aluminum film was laminated on the adhesive layer by means of a desk laminator and subjected to ultraviolet irradiation so as to cure the adhesive. After curing the adhesive, the cholesteric liquid crystal film was peeled off at the interface from the polyphenylene sulfide alignment film by pinching and pulling the end thereof at an angle of 180 degrees thereby obtaining Laminate J of the cholesteric liquid crystal film/adhesive layer/aluminum film laminated in this order.

From the observation of the cholesteric liquid crystal film surface of Laminate J, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, Laminate J was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when Laminate J was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of Laminate J had on the film surface a region exhibiting diffractivity and the diffracted light was a right-handed circularly polarized light. Furthermore, from the observations, it was found that the cholesteric liquid crystal film of Laminate J can be used as the cholesteric liquid crystal film of an optical laminate according to the present invention.

Onto the cholesteric liquid crystal film surface of Laminate J, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby obtaining Optical Laminate J-1 according to the present invention.

It was apparently confirmed that Laminate J-1 even when the ultraviolet absorber was laminated thereon exhibited the rainbow coloration characteristics caused by the diffraction pattern and the selective reflection characteristics peculiar to a cholesteric liquid crystal which are similar to those before the ultraviolet absorber was laminated.

Onto the cholesteric liquid crystal layer surface of Laminate J, was coated a UV-setting adhesive Aronix UV-3630 (manufactured by Toagosei Co., Ltd.) containing 20.0 percent by weight of photo-setting type acrylic oligeomer Aronix M-240 (manufactured by Toagosei Co., Ltd.) and 10.0 percent by weight of M-320 (manufactured by Toagosei Co., Ltd) with a thickness of 5 μm by means of a bar coater, followed by ultraviolet radiation so as to cure the adhesive thereby obtaining Optical Laminate J-2 according to the present invention.

Laminate J-2 was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystalline layer between before and after the test found that there was no difference in reflection color. Even after the test, it was confirmed that the rainbow coloration characteristics caused by the diffraction pattern and the selective reflection characteristics peculiar to a cholesteric liquid crystal were maintained.

Furthermore, the observation of the orientation state and light diffraction effect of the cholesteric liquid crystalline layer of Optical Laminate J-2 found that they did not change, compared with those before the test.

Onto the cholesteric liquid crystal film surface of Laminate J, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 μm by means of a bar coater, followed by ultraviolet irradiation so as to cure the adhesive, thereby forming an ultraviolet absorbing layer. Onto the ultraviolet absorbing layer, was coated a photo-setting acrylic oligomer adhesive wherein fine silica (Aerosil R812 manufactured by Nippon Aerosil Co., Ltd.) is dispersed, with a thickness of 5 μm by means of a bar coater, followed by ultraviolet radiation so as to cure the adhesive and form a hard coat layer thereby obtaining Optical Laminate J-3 according to the present invention.

It was apparently confirmed that Laminate J-3 even when the ultraviolet absorbing layer and hard coat layer were laminated thereon exhibited the rainbow coloration characteristics caused by the diffraction pattern and the selective reflection characteristics peculiar to a cholesteric liquid crystal which are similar to those before the ultraviolet absorbing layer and hard coat layer were laminated.

EXAMPLE 11

Onto a rubbed polyphenylene sulfide film (alignment substrate), was spin-coated a liquid crystalline polyester containing an R-form optically active compound and having a weight-average molecular weight Mw of 3,000, a molecular weight distribution Mw/Mn of 2.0, an inherent viscosity of 0.124, a Tg of 80° C., and a Ti of 230° C. so as to be formed into a film.

Thereafter, the film was heated at a temperature of 180° C. for 5 minutes, resulting in a film exhibiting a gold specular reflection.

From the measurement of transmission spectrum of the film thus obtained by means of an ultraviolet, visible, infrared spectrophotometer V-570 manufactured by JSCO Co., it was confirmed that there was formed a cholesteric liquid crystal film of which cholesteric phase exhibits a selective reflectance having a selective reflection wavelength band width of about 100 nm at a central wavelength of about 600 nm.

A ruled diffraction grating film (900 lines/mm, a product of Edmond Scientific Japan Co.) and the film thus obtained were superimposed together in such a manner that the diffraction surface and the liquid crystal surface faced each other, and then heated and pressurized at a temperature of 120° C. and pressure of 0.3 MPa and roll contact time of 0.5 second by means of Laminator DX-350 manufactured by Tokyo Laminex Co., followed by cooling to room temperature and removing the diffraction grating film thereby obtaining a laminate of the diffraction pattern-transferred cholesteric liquid crystal film/alignment substrate.

From the observation of the cholesteric liquid crystal film surface of the laminate, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the laminate was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the laminate was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of the laminate had on the film surface a region exhibiting diffractivity and the diffracted light was a right-handed circularly polarized light.

Onto the cholesteric liquid crystal film surface of the laminate, was coated a commercially available photo-setting type acrylic oligomer adhesive with a thickness of 5 μm by means of a bar coater. Then, a triacetyl cellulose (TAC) film was laminated on the adhesive layer by means of a desk laminator and subjected to ultraviolet irradiation so as to cure the adhesive.

After curing the adhesive, the cholesteric liquid crystal film was peeled off at the interface from the polyphenylene sulfide alignment film by pinching and pulling the end thereof at an angle of 180 degrees thereby obtaining a laminate of the diffraction pattern-transferred cholesteric liquid crystal film/adhesive layer/TAC film laminated in this order.

Onto the cholesteric liquid crystal film surface of the laminate thus obtained, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind., with a thickness of 5 μm by means of a bar coater, followed by ultraviolet irradiation so as to cure the adhesive, thereby obtaining an optical laminate according to the present invention.

The laminate thus obtained was subjected to an accelerated light-resisting test. The test was conducted at a radiation illuminance at a sample surface of 100 W/m$^2$ (wavelength range of 300 to 700 nm) for 100 hours by means of a xenon arc lamp type light-resistance test apparatus Sun Tester CPS manufactured by Shimadzu Corporation.

As a result, the visual comparison of the reflection color of the optical laminate between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystal layer of the optical laminate found that they did not change, compared with those before the test.

EXAMPLE 12

Onto a rubbed polyphenylene sulfide film (alignment substrate), was spin-coated a liquid crystalline polyester containing an R-form optically active compound and having a weight-average molecular weight Mw of 7000, a molecular weight distribution Mw/Mn of 2.0, an inherent viscosity of 0.144, a Tg of 85° C., and a Ti of 230° C. so as to be formed into a film.

Thereafter, the film was heated at a temperature of 200° C. for 5 minutes, resulting in a film exhibiting a gold specular reflection.

A laminate was prepared by following the procedures of Example 11 except using the film thus obtained. A protection layer is formed on the cholesteric liquid crystal film surface thereby obtaining an optical laminate according to the present invention. The optical laminate was subjected to the same accelerated light-resisting test as that of Example 11. The results of the test were similar to those of Example 11.

EXAMPLE 13

Onto a rubbed polyphenylene sulfide film (alignment substrate), was spin-coated a liquid crystalline polyester containing an R-form optically active compound and having a weight-average molecular weight Mw of 20000, a molecular weight distribution Mw/Mn of 2.2, an inherent viscosity of 0.344, a Tg of 102° C., and a Ti of 250° C. so as to be formed into a film.

Thereafter, the film was heated at a temperature of 220° C. for 5 minutes, resulting in a film exhibiting a gold specular reflection.

From the measurement of transmission spectrum of the film thus obtained by means of an ultraviolet, visible, infrared spectrophotometer V-570 manufactured by JASCO Co., it was confirmed that there was formed a cholesteric liquid crystal film of which cholesteric phase exhibits a selective reflectance having a selective reflection wavelength band width of about 100 nm at a central wavelength of about 600 nm.

A ruled diffraction grating film (900 lines/mm, a product of Edmond Scientific Japan Co.) and the film thus obtained were superimposed together in such a manner that the diffraction surface and the liquid crystal film surface faced each other, and then heated and pressurized at a temperature of 150° C. and pressure of 3 MPa and roll contact time of 0.5 second by means of Laminator DX-350 manufactured by Tokyo Laminex Co., followed by cooling to room temperature and removing the diffraction grating film thereby obtaining a laminate of the diffraction pattern-transferred cholesteric liquid crystal film/alignment substrate.

From the observation of the cholesteric liquid crystal film surface of the laminate, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the laminate was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the laminate was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film of the laminate had on the film surface a region exhibiting diffractivity and the diffracted light was a right-handed circularly polarized light. Furthermore, it was confirmed that the cholesteric liquid crystal film of the present invention can be obtained by transferring the diffraction pattern of the diffraction grating on the cholesteric liquid crystal film above.

Onto the cholesteric liquid crystal film surface of the laminate, was coated a commercially available photo-setting type acrylic oligomer adhesive containing an ultraviolet absorber and a hard coat agent, with a thickness of 5 μm by means of a bar coater. Then, a polyethylene terephthalate film was laminated on the adhesive layer by means of a desk laminator and subjected to ultraviolet irradiation so as to cure the adhesive. After curing the adhesive, the cholesteric liquid crystal film was peeled off at the interface from the polyphenylene sulfide film by pinching and pulling the end thereof at an angle of 180 degrees.

A triacetyl cellulose film was laminated on the cholesteric liquid crystal film through an ultraviolet-setting type adhesive by means of a desk laminator and subjected to ultraviolet irradiation so as to cure the adhesive. Thereafter, the polyethylene terephthalate film was peeled off at the interface of the adhesive layer containing the ultraviolet absorber and the hard coat agent thereby obtaining an optical laminate of the protection layer containing the ultraviolet absorber and the hard coat agent/cholesteric liquid crystal film/ adhesive layer/triacetyl cellulose according to the present invention.

COMPARATIVE EXAMPLE 3

Onto a rubbed polyphenylene sulfide film (alignment substrate), was spin-coated a liquid crystalline polyester containing an R-form optically active compound and having a weight-average molecular weight Mw of 950, a molecular weight distribution Mw/Mn of 2, an inherent viscosity of 0.06, a Tg of 60° C., and a Ti of 220° C. so as to be formed into a film.

Thereafter, the film was heated at a temperature of 180° C. for 5 minutes, resulting in a film exhibiting a gold specular reflection.

From the measurement of transmission spectrum of the film thus obtained by means of an ultraviolet, visible, infrared spectrophotometer V-570 manufactured by JASCO Co., it was confirmed that there was formed a cholesteric liquid crystal film of which cholesteric phase exhibits a selective reflectance having a selective reflection wavelength band width of about 100 nm at a central wavelength of about 600 nm.

A ruled diffraction grating film (900 lines/mm, a product of Edmond Scientific Japan Co.) and the film thus obtained were superimposed together in such a manner that the diffraction surface and the cholesteric liquid crystal film surface faced each other, and then heated and pressurized at a temperature of 120° C. and pressure of 0.3 MPa and roll contact time of 0.5 second by means of Laminator DX-350 manufactured by Tokyo Laminex Co., followed by cooling to room temperature and removing the diffraction grating film. The resulting film was partially cracked and had irregularities and unevenness in cholesteric orientation. Furthermore, the film did not exhibit the rainbow color characteristics caused by the diffraction pattern. Therefore, the preparation of an optical laminate was terminated.

COMPARATIVE EXAMPLE 4

Onto a rubbed polyphenylene sulfide film (alignment substrate), was spin-coated a liquid crystalline polyester containing an R-form optically active compound and having a weight-average molecular weight Mw of 120,000, a molecular weight distribution Mw/Mn of 4.0, an inherent viscosity of 2.0, a Tg of 150° C., and a Ti of 240° C. so as to be formed into a film.

Thereafter, the film was heated at a temperature of 220° C. for 20 minutes, resulting in a film exhibiting a light yellowish weak specular reflection.

From the measurement of transmission spectrum of the film thus obtained by means of an ultraviolet, visible, infrared spectrophotometer V-570 manufactured by JASCO Co., the central wavelength could not clearly be located in the region of 550 to 600 nm, and the selective reflection wavelength band width exhibited a weak broad selective reflectance. From the observation of the film by means of a microscope BX50 manufactured by Olympus Optical Co., Ltd., it was confirmed that there were a large number of defects in orientation on the film.

A ruled diffraction grating film (900 lines/mm, a product of Edmond Scientific Japan Co.) and the film thus obtained were superimposed together, and then heated and pressurized at a temperature of 120° C. and pressure of 3 MPa and roll contact time of 0.5 second by means of Laminator DX-350 manufactured by Tokyo Laminex Co., followed by cooling to room temperature and removing the diffraction grating film. The resulting film had more defectives in orientation, and did not exhibit the rainbow color characteristics caused by the diffraction pattern. Therefore, the preparation of an optical laminate was terminated.

COMPARATIVE EXAMPLE 5

Onto a rubbed polyphenylene sulfide film (alignment substrate), was spin-coated a liquid crystalline polyester containing an R-form optically active compound and having a weight-average molecular weight Mw of 95,000, a molecular weight distribution Mw/Mn of 6.0, an inherent viscosity of 1.5, a Tg of 145° C., and a Ti of 240° C. so as to be formed into a film.

Thereafter, the film was heated at a temperature of 220° C. for 20 minutes, resulting in a film exhibiting a light yellowish weak specular reflection.

From the measurement of transmission spectrum of the film thus obtained by means of an ultraviolet, visible, infrared spectrophotometer V-570 manufactured by JASCO Co., the central wavelength could not clearly be located in the region of 550 to 600 nm, and the selective reflection wavelength band width exhibited a weak broad selective reflectance. From the observation of the film by means of a microscope BX50 manufactured by Olympus Optical Co., Ltd., it was confirmed that there were a large number of defects in orientation on the film.

The same diffraction grating film as that of Comparative Example 4 was superimposed on the film obtained above such that the diffraction surface face thereto. After the diffraction pattern was transferred to the film under the same conditions of Comparative Example 4, the diffraction grating film was peeled off. The resulting film was further defective in orientation, and did not exhibit the rainbow coloration characteristics caused by the diffraction pattern. Therefore, the preparation of an optical laminate was terminated.

COMPARATIVE EXAMPLE 6

Onto a rubbed polyphenylene sulfide alignment film, was spin-coated a liquid crystalline polyester containing an R-form optically active compound and having a weight-average molecular weight Mw of 98,000, a molecular weight distribution Mw/Mn of 3.0, an inherent viscosity of 1.8, a Tg of 205° C., and a Ti of 250° C. so as to be formed into a film. Thereafter, the film was heated at a temperature of 230° C. for 20 minutes, resulting in a film exhibiting a light yellowish weak specular reflection.

From the measurement of transmission spectrum of the film thus obtained by means of an ultraviolet, visible, infrared spectrophotometer V-570 manufactured by JASCO Co., the central wavelength could not clearly be located in the region of 550 to 600 nm, and the selective reflection wavelength band width exhibited a weak broad selective reflectance. From the observation of the film by means of a microscope BX50 manufactured by Olympus Optical Co., Ltd. it was confirmed that there were a large number of defects in orientation on the film.

The same diffraction grating film as that of Comparative Example 4 was superimposed on the film obtained above such that the diffraction surface face thereto. After the diffraction pattern was transferred to the film under the same conditions of Comparative Example 4, the diffraction grating film was peeled off. The resulting film was further defective in orientation, and did not exhibit the rainbow color caused by the diffraction pattern. Therefore, the preparation of an optical laminate was terminated.

COMPARATIVE EXAMPLE 7

Onto a rubbed polyphenylene sulfide alignment film, was spin-coated a liquid crystalline polyester containing an R-form optically active compound and having a weight-average molecular weight Mw of 1040, a molecular weight distribution Mw/Mn of 2.1, an inherent viscosity of 0.06, a Tg of 15° C., and a Ti of 36° C. so as to be formed into a film. Thereafter, the film was heated at a temperature of 30° C. for 5 minutes, resulting in a film exhibiting a gold specular reflection.

From the measurement of transmission spectrum of the film thus obtained by means of an ultraviolet, visible, infrared spectrophotometer V-570 manufactured by JASCO Co., it was confirmed that there was formed a cholesteric liquid crystal film of which cholesteric phase exhibits a selective reflectance having a selective reflection wavelength band width of about 100 nm at a central wavelength of about 600 nm.

The same diffraction grating film as that of Comparative Example 3 was superimposed on the film obtained above such that the diffraction surface faced thereto. After the diffraction pattern was transferred to the film under the same conditions of Comparative Example 3, the diffraction grating film was peeled off. The resulting film had the cholesteric liquid crystalline phase a part of which was transferred to an isotropic phase and irregularities and unevenness in the cholesteric phase. Furthermore, the film did not exhibit the rainbow coloration characteristics caused by the diffraction pattern. Therefore, the preparation of an optical laminate was terminated.

COMPARATIVE EXAMPLE 8

Onto a rubbed polyphenylene sulfide film (alignment substrate), was spin-coated a liquid crystalline polyester containing an R-form optically active compound and having a weight-average molecular weight Mw of 1030, a molecular weight distribution Mw/Mn of 2.2, an inherent viscosity of 0.046, a Tg of 20° C., and a Ti of 115° C. so as to be formed into a film.

Thereafter, the film was heated at a temperature of 100° C. for 5 minutes, resulting in a film exhibiting a gold specular reflection.

From the measurement of transmission spectrum of the film thus obtained by means of an ultraviolet, visible, infrared spectrophotometer V-570 manufactured by Nippon Bunko Co., it was confirmed that there was formed a cholesteric liquid crystal film of which cholesteric phase exhibits a selective reflectance having a selective reflection wavelength band width of about 100 nm at a central wavelength of about 600 nm.

The same diffraction grating film as that of Comparative Example 4 was superimposed on the film obtained above such that the diffraction surface faced thereto. After the diffraction pattern was transferred to the film under the same conditions of Comparative Example 4, the diffraction grating film was peeled off. The resulting film was partially cracked and had irregularities and unevenness in the cholesteric phase. Furthermore, the film did not exhibit the rainbow coloration characteristics caused by the diffraction pattern. Therefore, the preparation of an optical laminate was terminated.

COMPARATIVE EXAMPLE 9

Onto a rubbed polyphenylene sulfide film (alignment substrate), was spin-coated a liquid crystalline polyester containing an R-form optically active compound and having a weight-average molecular weight Mw of 98,900, a molecular weight distribution Mw/Mn of 4.0, an inherent viscosity of 2.5, a Tg of 148° C., and a Ti of 250° C. so as to be formed into a film. Thereafter, the film was heated at a temperature of 220° C. for 20 minutes, resulting in a film exhibiting a light yellowish weak specular reflection.

From the measurement of transmission spectrum of the film thus obtained by means of an ultraviolet, visible, infrared spectrophotometer V-570 manufactured by JASCO Co., the central wavelength could not clearly be located in the region of 550 to 600 nm, and the selective reflection wavelength band width exhibited a weak broad selective reflectance. From the observation of the film by means of a microscope BX50 manufactured by Olympus Optical Co., Ltd. it was confirmed that there were a large number of defects in orientation on the film and thus was not formed a uniform cholesteric phase.

The same diffraction grating film as that of Comparative Example 4 was superimposed on the film obtained above such that the diffraction surface faced thereto. After the diffraction pattern was transferred to the film under the same conditions of Comparative Example 4, the diffraction grating film was peeled off. The resulting film was further defective in the orientation, and did not exhibit the rainbow color caused by the diffraction pattern. Therefore, the preparation of an optical laminate was terminated.

EXAMPLE 14

There was prepared an N-methyl-2-pyrrolidone solution (solution concentration: 20 percent by weight)of a liquid crystalline polyester containing an R-form optically active compound and having an inherent viscosity of 0.144 dl/g, and a Tg of 85° C. Onto a rubbed polyimide SE-5291 manufactured by Nissan Chemical Industries Ltd. laminated on a polyether sulfone film manufactured by Sumitomo Bakelite Co., Ltd., used as an alignment substrate, was spin-coated the solution obtained above, followed by heating at a temperature of 200° C. for 5 minutes thereby obtaining a film exhibiting a gold specular reflection.

From the measurement of transmission spectrum of the film thus obtained by means of an ultraviolet, visible, infrared spectrophotometer V-570 manufactured by JASCO Co., it was confirmed that there was formed a cholesteric liquid crystal film of which cholesteric phase exhibits a selective reflectance having a selective reflection wavelength band width of about 100 nm at a central wavelength of about 600 nm.

A ruled diffraction grating film (900 lines/mm, a product of Edmond Scientific Japan Co.) and the film thus obtained were superimposed together in such a manner that the diffraction surface and the liquid crystal surface faced each other, and placed on the plate of a 26-ton press machine manufactured by Sinnei Sangyo Co., followed by heating and pressurizing at a temperature of 90° C. and pressure of 5 MPa for 1 minute. Thereafter, the films were removed from the press, and the grating film was peeled off.

From the observation of the cholesteric liquid crystal film surface, it was apparently confirmed that there were the rainbow coloration characteristics caused by the diffraction pattern and the selective reflection characteristics peculiar to the cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness. The number of helical turns in this region was 4.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the laminate was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the laminate was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film had on the film surface a region exhibiting diffractivity and the diffracted light was a right-handed circularly polarized light.

Onto the diffraction pattern transferred surface of the cholesteric liquid crystal film, was coated a commercially available photo-setting type acrylic adhesive with a thickness of 5 μm by means of a bar coater. Then, a triacetyl cellulose (TAC) film as a supporting substrate was laminated on the adhesive layer by means of a laminator and subjected to ultraviolet irradiation so as to cure the adhesive.

After curing the adhesive, the cholesteric liquid crystal film was peeled off from the alignment substrate thereby obtaining a laminate of the diffraction pattern-transferred cholesteric liquid crystal film/adhesive layer/TAC film laminated in this order.

Onto the cholesteric liquid crystal film surface of the laminate thus obtained, was coated a silicone varnish KR9706 manufactured by Shin-Etsu Chemical Co., Ltd. with a thickness of 5 μm by means of a bar coater, followed by heat-curing the varnish so as to form a protection layer thereby obtaining an optical laminate of the silicone hard coat layer/cholesteric liquid crystal layer/adhesive layer/TAC film according to the present invention.

The resulting laminate was apparently confirmed to exhibit the rainbow coloration characteristics caused by the diffraction pattern and the selective reflection characteristics peculiar to a cholesteric liquid crystal.

EXAMPLE 15

The procedures of Example 14 was followed except that a rubbed polyphenylene sulfide film was used as an alignment substrate thereby obtaining a laminate of the cholesteric liquid crystal layer/adhesive layer/TAC film. The resulting laminate was apparently confirmed to exhibit the rainbow coloration characteristics caused by the diffraction pattern and the selective reflection characteristics peculiar to a cholesteric liquid crystal.

The polyphenylene sulfide alignment film substrate was peeled off from the laminate thereby obtaining a laminate of the TAC supporting film substrate/adhesive layer/cholesteric liquid crystal film having such a structure that the diffraction pattern-transferred cholesteric liquid crystal film surface is bonded to the TAC film through the adhesive.

Onto the cholesteric liquid crystal film surface of the laminate thus obtained, was coated a silicone varnish KR9706 manufactured by Shin-Etsu Chemical Co., Ltd. with a thickness of 5 μm by means of a bar coater, followed by heat-curing the varnish so as to form a protection layer thereby obtaining an optical laminate of the silicon hard coat layer/cholesteric liquid crystal layer/adhesive layer/TAC film according to the present invention.

The laminate thus obtained was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of the optical laminate found that they did not change, compared with those before the test.

EXAMPLE 16

An N-methyl-2-pyrrolidone solution (concentration: 20 percent by weight) of the same liquid crystalline polyester as that of Example 12 was spin-coated on a rubbed polyphenylene sulfide film (alignment substrate) and then heated at a temperature of 200° C. for 5 minutes thereby obtaining a film exhibiting a gold specular reflection.

A ruled diffraction grating film (900 lines/mm, a product of Edmond Scientific Japan Co.) and the film thus obtained were superimposed together in such a manner that the diffraction surface and the cholesteric liquid crystal film surface faced each other, and then heated and pressurized at a temperature of 120° C. and pressure of 0.3 MPa and roll contact time of 1 second by means of Laminator DX-350 manufactured by Tokyo Laminex Co. so as to transfer the diffraction pattern on the film obtained above.

From the observation of the cholesteric liquid crystal film surface, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the laminate was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the laminate was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film had on the film surface a region exhibiting diffractivity and the diffracted light was a right-handed circularly polarized light.

Onto the cholesteric liquid crystal film surface, was coated a commercially available photo-setting type acrylic oligomer adhesive with a thickness of 5 µm by means of a bar coater. Onto the coated surface was laminated a TAC film supporting substrate, followed by ultraviolet irradiation so as to cure the adhesive thereby obtaining a laminate. The polyphenylene sulfide alignment film was peeled off from the cholesteric liquid crystal film surface.

Onto the exposed cholesteric liquid crystal film surface, was coated a silicone varnish KR9706 manufactured by Shin-Etsu Chemical Co., Ltd. with a thickness of 5 µm by means of a bar coater, followed by heat-curing the varnish so as to form a protection layer thereby obtaining an optical laminate of the silicone-based hard coat layer/cholesteric liquid crystal layer/TAC film according to the present invention.

The laminate thus obtained was subjected to a wear resistance test by means of a friction tester FR-I type manufactured by Suga Test Instruments Co., Ltd. The test was conducted in accordance with JIS-L-0849, with the proviso that the number of friction was 50 cycles per 50 seconds.

After the test, no scar was found and the criterion of discoloration was 3–4. The visual comparison of the reflection color of the cholesteric liquid crystal layer between before and after the test found that there was no difference in reflection color. Even after the test, it was confirmed that the rainbow coloration characteristics caused by the diffraction pattern and the selective reflection characteristics peculiar to a cholesteric liquid crystal were maintained. Furthermore, the observation of the orientation state and light diffraction effect of the cholesteric liquid crystalline layer of the laminate found that they did not change, compared with those before the test.

REFERENCE EXAMPLE 11

Preparation of a Cholesteric Liquid Crystal Film

There was prepared an N-methyl-2-pyrrolidone solution (solution concentration: 20 percent by weight)of a liquid crystalline polyester containing an R-form optically active compound and having an inherent viscosity at 30° C. of 0.145 dl/g, and a Tg of 85° C.

The solution thus obtained was spin-coated on a rubbed polyphenylene sulfide film (PPS; alignment substrate) and heated at a temperature of 200° C. for 5 minutes, resulting in the formation of a cholesteric liquid crystal film exhibiting a gold selective reflection on the alignment substrate.

The transmission spectrum of the film was measured by means of an ultraviolet, visible, infrared spectrophotometer V-570 manufactured by JASCO Co. It was confirmed that there was formed a cholesteric liquid crystal film exhibiting a selective reflection having a central wavelength of about 600 nm and a selective reflection wavelength bandwidth of about 100 nm and having a thickness of 1.6 µm.

EXAMPLE 17

A ruled diffraction grating film (900 lines/mm, a product of Edmond Scientific Japan Co.) and the film obtained in Reference Example 11 were superimposed together in such a manner that the diffraction surface and the cholesteric liquid crystal surface on the PPS film faced each other, and then heated and pressurized at a temperature of 120° C. and pressure of 0.3 MPa and roll contact time of 0.5 second by means of Laminator DX-350 manufactured by Tokyo Laminex Co., followed by cooling to room temperature and removing the diffraction grating film thereby obtaining a diffraction pattern-transferred cholesteric liquid crystal film.

From the observation of the cholesteric liquid crystal film surface, it was apparently confirmed that there were the rainbow coloration characteristics caused by the diffraction pattern and the selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness. The number of helical turns in this region was 5.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the laminate was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the laminate was observed through a left-handed circularly polarizing plate transmitting only a left-handed circularly polarized light, there was observed a dark field and no reflection/diffraction light of rainbow color.

From the foregoing observations, it was confirmed that the cholesteric liquid crystal film had on the film surface a region exhibiting diffractivity and the diffracted light was a right-handed circularly polarized light.

Onto the diffraction pattern-transferred surface of the cholesteric liquid crystal film, was coated a commercially available photo-setting type acrylic adhesive with a thickness of 5 µm by means of a bar coater. Then, after a triacetyl cellulose (TAC) supporting film substrate was laminated on the adhesive layer by means of a laminator and subjected to ultraviolet irradiation so as to cure the adhesive, the PPS alignment film substrate was peeled off at the direction of 180 degrees.

Onto the exposed cholesteric liquid crystal film was coated a photo-setting acrylic adhesive with a thickness of 5 µm. Thereafter, onto the coated surface was laminated a TAC supporting film substrate by means of a laminator, followed by ultraviolet irradiation so as to cure the adhesive thereby obtaining an optical laminate functioning as a polarizing diffraction element according to the present invention.

The laminate thus obtained was subjected to observations by means of a polarizing microscope and a transmission electron microscope and an observation to see the orientation state by an He/Ne laser beam with a wavelength of 632.8 nm made vertically incident into the cholesteric liquid crystal film. There was observed no difference from before the lamination of the supporting substrate. From a visual observation, there were apparently confirmed the rainbow coloration characteristics caused by the diffraction pattern and the selective reflection characteristics peculiar to a cholesteric liquid crystal.

EXAMPLE 18

The same procedures of Example 17 were followed thereby obtaining a diffraction pattern-transferred cholesteric liquid crystal film on a PPS alignment film substrate.

A commercially available photo-setting acrylic adhesive was coated on the cholesteric liquid crystal film surface on the PPS film, and a polyester supporting film with a thickness of 25 μm was bonded thereon. Thereafter, the PPS alignment substrate film was peeled off thereby obtaining a laminate of the supporting substrate/photo-setting adhesive layer/cholesteric liquid crystal film.

A protection layer was formed on the cholesteric liquid crystal film of the laminate thereby obtaining an optical laminate functioning as a polarizing diffraction element according to the present invention. The protection layer was formed from a 80 μm thick UV absorber-containing triacetyl cellulose (TAC) film UVD80 manufactured by Fuji Photo Film Co. and a commercially available polyester-based hot melt adhesive by means of a laminator heated to 100° C.

It was apparently confirmed that the resulting laminate exhibited the rainbow coloration characteristics caused by the diffraction pattern and the selective reflection characteristics peculiar to a cholesteric liquid crystal.

EXAMPLE 19

The same procedures of Example 17 were followed thereby obtaining a diffraction pattern-transferred cholesteric liquid crystal film on a PPS alignment film.

A 25 μm thick polyester film coated with a silicone-based releasing agent (easily peelable substrate) was bonded to the PPS film obtained above with a commercially available acrylic photo-setting type adhesive such that the releasing agent-coated surface faced the cholesteric liquid crystal film surface on the PPS film. Thereafter, only the PPS alignment film was peeled off thereby obtaining a laminate of the easily peel off substrate/photo-setting type adhesive/cholesteric liquid crystal film.

A commercially available polyester-based hot melt adhesive was coated on the cholesteric liquid crystal film surface of the laminate by a conventional manner. Onto the adhesive layer was superimposed a 1 mm thick polyvinyl chloride sheet having on a surface an aluminum-deposited film such that the film surface faced the adhesive layer. They were then hot-stumped thereby obtaining a laminate. The easily peelable film was able to be clearly peeled off from the photo-setting type adhesive layer thereby obtaining a laminate with the photo-setting adhesive layer as a protection layer and the polyvinyl chloride sheet as a supporting substrate according to the present invention.

It was apparently confirmed that the resulting laminate exhibited the rainbow coloration characteristics caused by the diffraction pattern and the selective reflection characteristics peculiar to a cholesteric liquid crystal.

EXAMPLE 20

A polycondensation reaction was conducted using 50 mmol of terephthalic acid, 20 mmol of hydroxybenzoic acid, 20 mmol of catechol, 10 mmol of (R)-2-methyl-1,4-butanediol, and 100 mg of sodium acetate under a nitrogen atmosphere while elevating a temperature stepwise, like 180° C. for 1 hour, 200° C. for 1 hour, and 250° C. for 1 hour.

The polycondensation was continued at a temperature of 250° C. for 2 hours while discharging the nitrogen and continued for another 1 hour at the same temperature under reduced pressure. The resulting polymer was dissolved in tetrachloroethane and reprecipitated with methanol thereby obtaining a liquid crystalline polyester.

A solution of the resulting polyester dissolved in N-methyl-2-pyrrolidone (20 percent by weight) was prepared and spin-coated to a rubbed polyphenylene sulfide alignment film. After the coating, the film was dried so as to remove the N-methyl-2-pyrrolidone thereby forming a liquid crystalline polyester film over the polyphenylene sulfide film. The thickness of the dried polyester film was measured by means of a contact type film thickness meter and found to be 1.6 μm.

Thereafter, the liquid crystalline film on the alignment substrate was subjected to a heat treatment at a temperature of 185° C. for 5 minutes and cooled to room temperature thereby obtaining on the alignment substrate a polyester film exhibiting a gold specular reflection.

The transmission spectrum of the film was measured by means of an ultraviolet, visible, infrared spectrophotometer V-570 manufactured by JASCO Co. It was confirmed that there was formed a cholesteric liquid crystal film exhibiting a selective reflection having a central wavelength of about 600 nm and a selective reflection wavelength bandwidth of about 110 nm.

The specular competent exclude (SCE) and specular competent include (SCI) of the film was measured by means of a spectral colorimeter CM-3500d manufactured by Minolta Co., Ltd. and found to be 4 percent and 45 percent, respectively. The diffusivity was about 9 percent. From a visual observation, it was confirmed that the film was a metal glossy gold color and had a texture exhibiting luxuriousness.

A bright reflection light was observed from the direction of the specular reflection but not observed at the other angles. The film had the same properties as a specular surface.

The phase and cross-section of the cholesteric liquid crystal film were observed by means of a polarizing microscope and a transmission electron microscope. It was confirmed that the helical axes of the cholesteric liquid crystal phase were homogeneously parallel with each other in the direction of the thickness.

A ruled diffraction grating film (900 lines/mm, a product of Edmond Scientific Japan Co.) and the film thus obtained were superimposed together in such a manner that the diffraction surface and the cholesteric liquid crystal film surface faced each other, and then heated and pressurized at a temperature of 150° C. and pressure of 0.3 MPa and roll contact time of 0.5 second by means of Laminator DX-350 manufactured by Tokyo Laminex Co., followed by cooling to room temperature and removing the diffraction grating film thereby transferring the diffraction pattern on the cholesteric liquid crystal film.

From the observation of the cholesteric liquid crystal film surface, it was apparently confirmed that there were the rainbow coloration characteristics caused by the diffraction pattern and the gold selective reflection characteristics peculiar to a cholesteric liquid crystal. Furthermore, the phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness, and the helical pitches lengths were homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the film was placed under an ordinary interior illumination and was observed through a right-handed circularly polarizing plate transmitting only a right-handed circularly polarized light. As a result, there was observed a reflected/diffracted light of rainbow color with substantially the same brightness as that observed without the polarizing plate. Whereas, when the film was observed through a left-handed circularly polarizing plate transmitting only a left-handed circularly polarized light, there was observed a dark field and neither reflection/diffraction light of rainbow color nor the gold reflection color caused by the cholesteric liquid crystal.

The diffusivity of the cholesteric liquid crystal film with the diffraction pattern transferred was measured by the same method as the above and found to be about 9 percent.

As apparent from the foregoing, the cholesteric liquid crystal film was found to have a diffusivity of about 9 percent and a region exhibiting diffractivity on its surface.

Onto the cholesteric liquid crystal film surface with the diffraction pattern transferred, was coated a commercially available photo-setting type acrylic oligomer adhesive with a thickness of 5 µm by means of a bar coater. Then, a TAC film was laminated on the adhesive layer by means of a desk laminator and subjected to ultraviolet irradiation so as to cure the adhesive. After curing the adhesive, the cholesteric liquid crystal film was peeled off from the alignment substrate by pinching and pulling the end thereof at an angle of 180 degrees thereby obtaining a laminate of the cholesteric liquid crystal film/adhesive layer/TAC film laminated in this order.

Onto the cholesteric liquid crystal film surface of the laminate thus obtained, was coated a UV-setting adhesive Aronix UV-3630 (manufactured by Toagosei Co., Ltd. and diluted with M-111 manufactured by the same so as to be 250 mPa·s in viscosity) containing 5.0 percent by weight of a benzophenone-based ultraviolet absorber Cyasorb UV-24 manufactured by Cytec Ind. with a thickness of 5 µm by means of a bar coater, followed by ultraviolet irradiation so as to cure the adhesive, thereby obtaining a laminate according to the present invention.

EXAMPLE 21

A solution was obtained by dissolving 6.42 g of bis 1,4[4-(6-acryloyloxyhexyl)benzoyl]methylhydroquinone, 0.98 g of 1-[4-(6-acryloyloxyhexyloxy)benzoyloxy]4-cyano benzene, both of which are positive uniaxial liquid crystalline compounds, and 2.60 g of a commercially available chiral dopant liquid crystal S-811 manufactured by Rodick Co. in 90 g of distilled N-methyl-2-pyrrolidone. The resulting solution was mixed with 0.5 mg of fluorine-based surface active agent S-383 manufactured by Asahi Glass Company, 0.3 g of a photo-initiator Irgacure 907 manufactured by Ciba-Geigy Co., and 0.1 g of a diethyl-thioxanthone photo-sensitizer. The resulting solution was applied onto a polyethylene naphthalate (PEN) film manufactured by Mitsubishi Daiya Foil Co. with a surface rubbed with a rayon cloth, by means of a bar coater. Thereafter, the film was placed in a clean oven set at a temperature of 60° C. and dried for 15 minutes. The film was then heated in the same oven set at a temperature of 85° C. for 6 minutes and cooled from the temperature to 50° C. at a rate of about 1° C./minute thereby obtaining a film having the aforesaid low molecule cholesteric liquid crystal on the PEN film. The thickness of the film was measured by means of a contact type film thickness meter and found to be 1.5 µm.

Next, the cholesteric liquid crystal film together with the PEN film was placed in an oven set at a temperature of 50° C. again and subjected to ultraviolet irradiation under a nitrogen atmosphere with an oxygen concentration of 250 ppm or less. The ultraviolet irradiation was conducted by means of a high pressure mercury vapor lump under the conditions where the maximum irradiation intensity was 120 W/cm$^2$, the integrated irradiation dose was 135 mJ, and the irradiation time was 5 seconds. The cholesteric liquid crystal film after the irradiation was cured to some extent and did not have a flowability as seen before the irradiation. The surface hardness of the film was lower than 6B in pencil hardness and was not able to be determined precisely.

The film was cut into a rectangle with a length of 10 cm and a width of 3 cm such that the rubbing direction was the direction of the length. A commercially available embossed film J52,989 manufactured by Edmond Scientific Japan Co. was cut into a rectangle with a length of 12 cm and a width of 5 cm such that the grating direction of the diffraction grating was the direction of the length. Then, both the rectangular pieces were superposed one on another such that the cholesteric liquid crystal film surface was in contact with the diffraction grating surface of the embossed film. One shorter side of the superposed films was then fixed with a cellophane tape. The films were inserted through a thermo-laminating apparatus DX-350 manufactured by Tokyo Laminex Co. such that the shorter end was the leading end. The thermolamination was conducted at a laminating roll temperature of 72° C. and a travel speed of the sample of 30 mm per second. The laminate after having been discharged from the apparatus was cooled to room temperature and then subjected to electron beam irradiation at room temperature. The electron beam irradiation was conducted by means of an electron beam irradiation apparatus manufactured by Eye Electron Beam Co. at room temperature and an accelerating voltage of 30 kV under a 0.20 percent oxygen concentration atmosphere. After the irradiation, the embossed film was peeled off from the laminate along the longitudinal direction. The cholesteric liquid crystal film remaining on the PEN film was cured and the surface hardness of the film was of the order of 2H in pencil hardness.

The transmission spectrum of the cured cholesteric liquid crystal film was measured by means of an ultraviolet, visible, infrared spectrophotometer V-570 manufactured by JASCO Co. It was confirmed that there was formed a cholesteric liquid crystal film exhibiting a selective reflection having a central wavelength of about 580 nm and a selective reflection wavelength bandwidth of about 40 nm.

The specular competent exclude (SCE) and specular competent include (SCI) of the cholesteric liquid crystal film was measured by means of a spectral calorimeter CM-3500d manufactured by Minolta Co., Ltd. and found to be 5 percent and 43 percent, respectively. The diffusivity was about 12 percent.

From a visual observation, it was confirmed that the film was a metal glossy gold color and had a texture exhibiting luxuriousness. A bright reflection light was observed from the direction of the specular reflection but not observed at the other angles. The film had the same properties as a specular surface. Furthermore, other than the reflection derived from the cholesteric phase, the film was observed to exhibit a light of rainbow color resulting from the diffraction grating as seen from the 3 o'clock and 9 o'clock positions when the film length direction is seen at the 12 o'clock position.

The phase and cross-section of the cholesteric liquid crystal film layer were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness. It was also confirmed that in the other region, the helical axes were homogeneously parallel with each other in the direction of the thickness and the helical pitches lengths were homogeneously equal in the direction of the thickness.

An He/Ne laser beam was made vertically incident into the cholesteric liquid crystal film from the PEN film side. As a result, the laser beams of zero order and ±first-order were observed at exit angle of 0° and about ±9°. For the purpose of checking polarization characteristics, the film was placed under an ordinary interior illumination and was observed through a right-handed circularly polarizing plate transmitting only a right-handed circularly polarized light. As a result, there were observed a reflected/diffracted light of rainbow color and a very vivid yellow reflection caused by the cholesteric liquid crystal with substantially the same brightness as that observed without the polarizing plate. Whereas, when the film was observed through a left-handed circularly polarizing plate transmitting only a left-handed circularly polarized light, there was observed a dark field and no reflection/diffraction light of rainbow color.

From the foregoing, it was confirmed that the cholesteric liquid crystal film on the PEN film had a diffusivity of about 12 percent and a region exhibiting diffractivity on the surface.

The procedures of Example 20 were followed except using the laminate of the PEN film/cholesteric liquid crystal film obtained above instead of the laminate of the polyphenylene sulfide film/cholesteric liquid crystal film used in Example 20 thereby obtaining an optical laminate according to the present invention.

EXAMPLE 22

A polycondensation reaction was conducted using 50 mmol of terephthalic acid, 20 mmol of hydroxybenzoic acid, 20 mmol of catechol, 10 mmol of (R)-2-methyl-1,4-butanediol, and 100 mg of sodium acetate under a nitrogen atmosphere while elevating a temperature stepwise, like 180° C. for 1 hour, 200° C. for 1 hour, and 250° C. for 1 hour.

The polycondensation was continued at a temperature of 250° C. for 2 hours while discharging the nitrogen and continued for another 1 hour at the same temperature under reduced pressure. The resulting polymer was dissolved in tetrachloroethane and reprecipitated with methanol thereby obtaining a liquid crystalline polyester.

A solution of the resulting polyester dissolved in N-methyl-2-pyrrolidone (20 percent by weight) was prepared and then spin-coated to a rubbed polyphenylene sulfide film. After the coating, the film was dried so as to remove the N-methyl-2-pyrrolidone thereby forming a liquid crystalline polyester film over the polyphenylene sulfide film. The thickness of the film was measured by means of a contact type film thickness meter and found to be about 2.0 μm.

Thereafter, the liquid crystalline film was subjected to a heat treatment at a temperature of 185° C. for 3 minutes and cooled to room temperature thereby obtaining on the polyphenylene sulfide film a liquid crystalline polyester film exhibiting a gold reflection.

The transmission spectrum of the film was measured by means of an ultraviolet, visible, infrared spectrophotometer V-570 manufactured by JASCO Co. It was confirmed that there was formed a cholesteric liquid crystal film exhibiting a selective reflection having a central wavelength of about 602 nm and a selective reflection wavelength bandwidth of about 110 nm. The specular competent exclude (SCE) and specular competent include (SCI) of the film was measured by means of a spectral colorimeter CM-3500d manufactured by Minolta Co., Ltd. and found to be 19 percent and 45 percent, respectively. The diffusivity was about 42 percent.

From a visual observation, it was confirmed that the film exhibited a knurling gold reflection light and a similar reflection light was able to be seen from all the directions. Furthermore, the film did not reflect the observer and was extremely excelled in visibility.

A diffraction pattern was transferred to the cholesteric liquid crystal film surface using the same diffraction grating film as that used in Example 20 under the same conditions. Thereafter, the diffraction grating film was removed.

From the observation of the cholesteric liquid crystal film surface with the diffraction pattern transferred, it was apparently confirmed that there were the rainbow coloration characteristics caused by the diffraction pattern and the selective reflection peculiar characteristics to a cholesteric liquid crystal. Furthermore, the phase and cross-section of the cholesteric liquid crystal film were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°. For the purpose of checking polarization characteristics, the film was placed under an ordinary interior illumination and was observed through a right-handed circularly polarizing plate transmitting only a right-handed circularly polarized light. As a result, there were observed a reflected/diffracted light of rainbow color and a knurling gold reflection light with the same brightness as that observed without the polarizing plate. Whereas, when the film was observed through a left-handed circularly polarizing plate transmitting only a left-handed circularly polarized light, there was observed a dark field and neither reflection/diffraction light of rainbow color nor a gold reflection caused by the cholesteric liquid crystal.

The diffusivity of the film after the transformation of the diffraction pattern was measured by the above-described method and found to be about 42 percent.

Therefore, the film was confirmed to have on the surface a region exhibiting diffractivity.

Next, the cholesteric liquid crystal film with the diffraction pattern transferred was bonded to a TAC film through a commercially available photo-setting type adhesive in accordance with the procedures of Example 20. Thereafter, the alignment substrate was peeled off and then a protection layer was formed on the cholesteric liquid crystal film in accordance with the procedures of Example 20 thereby obtaining an optical laminate according to the present invention.

EXAMPLE 23

A solution of the same liquid crystalline polyester as that used in Example 22 dissolved in N-methyl-2-pyrrolidone (20 percent by weight) was spin-coated onto a rubbed polyphenylene sulfide alignment substrate film such that the coated film thickness after being dried is about 2.4 μm thereby forming a liquid crystalline polyester film on the alignment substrate.

The liquid crystalline polyester film on the alignment substrate was heated at a temperature of 175° C. for 4 minutes and cooled to room temperature thereby obtaining a liquid crystal film exhibiting a yellow reflection color.

The transmission spectrum of the film was measured by means of an ultraviolet, visible, infrared spectrophotometer V-570 manufactured by JASCO Co. It was confirmed that there was formed a cholesteric liquid crystal film exhibiting a selective reflection having a central wavelength of about 585 nm and a selective reflection wavelength bandwidth of about 100 nm. The specular competent exclude (SCE) and specular competent include (SCI) of the film were measured by means of a spectral colorimeter CM-3500d manufactured by Minolta Co., Ltd. and found to be 34 percent and 38 percent, respectively. The diffusivity was about 89 percent. From a visual observation, it was confirmed that the film exhibited a knurling gold reflection light with no specular reflection, and a similar reflection light was able to be seen from all the directions. Furthermore, the film did not reflect the observer and was extremely excelled in visibility.

The phase and cross-section of the cholesteric liquid crystal film were observed by means of a polarizing microscope and a transmission electron microscope, respectively. It was confirmed that there was formed a cholesteric orientation in the film surface wherein the helical axes of the cholesteric phase were homogeneously parallel with each other in the direction of the thickness.

A diffraction pattern was transferred on the cholesteric liquid crystal film surface on the alignment substrate using the same diffraction grating film as that used in Example 20 under the same conditions as those therein. Thereafter, the diffraction grating film was removed.

From the observation of the cholesteric liquid crystal film surface with the diffraction pattern transferred, it was apparently confirmed that there were the rainbow coloration caused by the diffraction pattern and the gold selective reflection peculiar to a cholesteric liquid crystal. Furthermore, the phase and cross-section of the cholesteric liquid crystal film were observed by means of a polarizing microscope and a transmission electron microscope, respectively. It was confirmed that there was formed a cholesteric orientation in the film surface wherein the helical axes of the cholesteric phase were not homogeneously parallel with each other in the direction of the thickness, and the helical pitches lengths were not homogeneously equal in the direction of the thickness.

An He/Ne laser beam with a wavelength of 632.8 nm was made vertically incident into the cholesteric liquid crystal film. As a result, the laser beam was observed at exit angle of 0° and about ±35°.

The diffusivity of the film with the diffraction pattern transferred was measured by the above-described method and found to be about 89 percent.

From the foregoing, the cholesteric liquid crystal film was confirmed to be non-specular with a diffusivity of about 89 percent and have on the surface a region exhibiting diffractivity.

Next, the cholesteric liquid crystal film with the diffraction pattern transferred was bonded to a TAC film through a commercially available photo-setting type adhesive in accordance with the procedures of Example 20. Thereafter, the alignment substrate was peeled off and then a protection layer was formed on the exposed cholesteric liquid crystal film in accordance with the procedures of Example 20 thereby obtaining an optical laminate according to the present invention.

What is claimed is:

1. An Optical laminate comprising a supporting substrate, an adhesive layer, a cholesteric liquid crystal layer, and a protection layer laminated in this order, wherein said cholesteric liquid crystal layer has on at least a part thereof a region exhibiting diffractivity and a cholesteric liquid crystal phase wherein the helical axes are not homogeneously parallel with each other in the direction of the thickness.

2. The optical laminate according to claim 1, wherein said cholesteric liquid crystal layer having on at least a part thereof a region exhibiting diffractivity has a cholesteric liquid crystal film onto which a diffraction pattern is transferred, produced by contacting a diffraction grating with said cholesteric liquid crystal film formed on an alignment substrate so as transfer the diffraction pattern of said grating thereon, and then removing said diffraction grating from said film and peeling off said alignment substrate.

3. The optical laminate according to claim 2, wherein said cholesteric liquid crystal film is formed from a polymeric liquid crystal having the following physical characteristics:

(1) weight-average molecular weight (Mw) in terms of polystyrene measured by GPC=1000 to 100000;

(2) molecular weight distribution (Mw/Mn wherein Mn is number-average molecular weight)=5 or less;

(3) inherent viscosity measured in a mixed solvent of phenol/tetrachloroethane of 60/40 weight ratio at 30° C. and a polymeric liquid crystal concentration of 0.5 g/dl=0.05 to 2.0;

(4) glass transition temperature (Tg)=200° C. or below; and (5) transition temperature from liquid crystalline phase to isotropic phase (Ti)=40° C. or higher.

4. The optical laminate according to claim 1 wherein said laminate is produced by the following steps:

(a) forming a cholesteric liquid crystal film on an alignment substrate;

(b) contacting a diffraction grating with said film so as to transfer the diffraction pattern of said grating on the surface of said film;

(c) bonding said diffraction pattern-transferred film surface to a supporting substrate through an adhesive so as to prepare a 4-layered laminate of said supporting substrate/adhesive layer/diffraction pattern-transferred cholesteric liquid crystal film/alignment substrate;

(d) peeling off said alignment substrate from said 4-layered laminate so as to prepare a 3-layered laminate of said supporting substrate/adhesive layer/diffraction pattern-transferred cholesteric liquid crystal film; and (e) forming a protection layer on said cholesteric liquid crystal film of said 3-layered laminate.

5. The optical laminate according to claim 1 wherein said laminate is produced by the following steps:

(a) forming a cholesteric liquid crystal film on an alignment substrate;

(b) contacting a diffraction grating with said film so as to transfer the diffraction pattern of said grating on the surface of said film;

(c) bonding said diffraction pattern-transferred film surface to an easily peelable substrate through a reactive adhesive containing an ultraviolet absorber and/or a hard coat agent and peeling off said alignment substrate so as to prepare a 3-layered laminate of said easily peelable substrate/protection layer/diffraction pattern-transferred film;

(d) bonding said cholesteric liquid crystal film of said 3-layered laminate to a supporting substrate through an adhesive so as to prepare a 5-layered laminated of said easily peelable substrate/protection layer/diffraction pattern-transferred film/adhesive layer/supporting substrate; and (e) peeling off said easily peelable substrate from said 5-layered laminate.

6. A polarizing diffraction element comprising a supporting substrate, an adhesive layer, a cholesteric liquid crystal layer, and a protection layer wherein said cholesteric liquid crystal layer has on at least a part thereof a region exhibiting diffractivity and a cholesteric liquid crystal phase wherein the helical axes are not homogeneously parallel with each other in the direction of the thickness.

7. A compensation element for a liquid crystal display comprising a supporting substrate, an adhesive layer, a cholesteric liquid crystal layer, and a protection layer wherein said cholesteric liquid crystal layer has on at least a part thereof a region exhibiting diffractivity and a cholesteric liquid crystal phase wherein the helical axes are not homogeneously parallel with each other in the direction of the thickness.

8. A decorative component comprising a supporting substrate, an adhesive layer, a cholesteric liquid crystal layer, and a protection layer wherein said cholesteric liquid crystal layer has on at least a part thereof a region exhibiting diffractivity and a cholesteric liquid crystal phase wherein the helical axes are not homogeneously parallel with each other in the direction of the thickness.

9. A counterfeit prevention element comprising a supporting substrate, an adhesive layer, a cholesteric liquid crystal layer, and a protection layer wherein said cholesteric liquid crystal layer has on at least a part thereof a region exhibiting diffractivity and a cholesteric liquid crystal phase wherein the helical axes are not homogeneously parallel with each other in the direction of the thickness.

* * * * *